United States Patent [19]

Monleone

[11] Patent Number: 6,064,920
[45] Date of Patent: May 16, 2000

[54] ELECTROEROSION APPARATUS DRIVE CONTROL SYSTEM EMPLOYING FUZZY LOGIC

[75] Inventor: Riccardo Monleone, Viganello, Switzerland

[73] Assignee: Agie SA, Losone, Switzerland

[21] Appl. No.: 08/787,664

[22] Filed: Jan. 23, 1997

[30] Foreign Application Priority Data

Jan. 24, 1996 [DE] Germany .......................... 196 02 454

[51] Int. Cl.[7] ................................................. G05B 19/39
[52] U.S. Cl. ................. 700/170; 364/474.3; 364/474.35
[58] Field of Search ................................... 318/560–567, 318/600–612, 623–628, 630–632, 577; 364/474.04, 148, 153, 157–162, 165, 474.12, 474.3, 474.35; 700/166, 186

[56] References Cited

U.S. PATENT DOCUMENTS

| | | | |
|---|---|---|---|
| 3,969,615 | 7/1976 | Bowers et al. ...................... | 364/474.31 |
| 4,678,976 | 7/1987 | Inoue ...................................... | 318/577 |
| 4,864,490 | 9/1989 | Nomoto et al. ......................... | 364/157 |
| 5,148,089 | 9/1992 | Adachi et al. . | |
| 5,170,026 | 12/1992 | Suga et al. . | |
| 5,213,077 | 5/1993 | Nishizawa et al. . | |
| 5,223,778 | 6/1993 | Svarovsky et al. ..................... | 318/610 |
| 5,285,378 | 2/1994 | Matsumoto ............................. | 364/157 |
| 5,363,023 | 11/1994 | Choho . | |
| 5,397,973 | 3/1995 | Dummermuth ......................... | 318/628 |
| 5,428,201 | 6/1995 | Kaneko et al. . | |
| 5,497,063 | 3/1996 | Day et al. ............................... | 318/610 |
| 5,684,375 | 11/1997 | Chaffee et al. ......................... | 318/638 |
| 5,745,361 | 4/1998 | Kim et al. .............................. | 364/148 |
| 5,748,467 | 5/1998 | Qin et al. ............................... | 364/148 |

FOREIGN PATENT DOCUMENTS

| | | |
|---|---|---|
| 0 241 286 | 9/1987 | European Pat. Off. . |
| 05 48 516 | 11/1992 | European Pat. Off. . |
| 43 21 284 | 2/1995 | Germany . |
| WO 95 04 956 | 2/1995 | WIPO . |

OTHER PUBLICATIONS

EPO Search Report Apr. 8, 1997.
German Search Report Sep. 6, 1996.
Yin, Tang–Kai, Lee, George C.S. "Fuzzy Model–Reference Adaptive Control", IEEE Transactions On System, Man, and Cybernetics, vol. 25, No. 12, Dec. 1995, pp. 1606–1615; insb. Fig. 1.
Passino, Kevin M.: Intelligent ontrol For Autonomous Systems. In: IEEE Spectrum, Jun. 1995, pp. 55–62; insb. Fig. auf S.57.
Koch, Mario, u.a.: Ein neues Entwurfskonzept für Fuzzy–Regelungen. In: Automatisierungstechnik 41, 1993, 5, pp. 152–156; insb.Bild 7 u. 12,S.155, re.Sp.,1.+2.Abs., S.156, Pkt.4.2.
Ebert, Crhostof, Schaub, andreas: Entwurf und Vergleich von Fuzzy–Reglern am Beispiel einer Heizungsanlage. In: Automatisierungstechnik 41, 1993, 5, S. 173–179; insb. S.175, li.Sp.,Z.3–6, S.178,li.Sp.,letzter Abs. bis re.Sp., 2.Abs., Bild 3u.13.

(List continued on next page.)

*Primary Examiner*—James P. Trammell
*Assistant Examiner*—Matthew Smithers
*Attorney, Agent, or Firm*—Darby & Darby

[57] ABSTRACT

An apparatus and method is provided for tuning a controller parameter of a PIV controller with a position, velocity and/or integral controller element for a control path of a drive in an electroerosion apparatus, with the help of a fuzzy controller, wherein for the purpose of tuning, a preset control input distribution, such as a time-dependent distribution of the position of the drive, is provided to the PIV controller as input variable and wherein an input variable of the fuzzy controller is derived from the control variable of the controller. Additional input variables of the fuzzy controller are derived from a controller output of the PIV controller.

45 Claims, 10 Drawing Sheets

OTHER PUBLICATIONS

Unbehauen, Heinz; Regelungstechnik I, Friedr. Vieweg & Sohn Verlagsgesellschaft mbH, Braunschweig/Wiesbaden, 1989, S.15, 215–217, 330–331; insb.Bild 8.2.1.

Mertz, Hartmut; EDM: Fuzzy setzt sich durch. In: Werkstatt und Betrieb 126, 1993, 12, S.758–760.

Zühlke, D: Vorschubregelung mit Fuzzy–Logik. In: Technica 19/94, S.16–21.

Journal A. Bd. 36, Nr. 3, Oct. 1, 1995, Seiten 4–10, 12–14, XP00541967 Kaymak U et al: "Fuzzy Control—Theory and Design".

Proceedings onf the Conference on Fuzzy Systems, Orlando, Jun. 26–29, 1994, Bd. 1, Jun. 26, 1994, Institute of Electrical and Electronics Engineers, Seiten 22–29, XP000529231 Xu J–X et al: "Combine Adaptive and Fuzzy Control using Multiple Models".

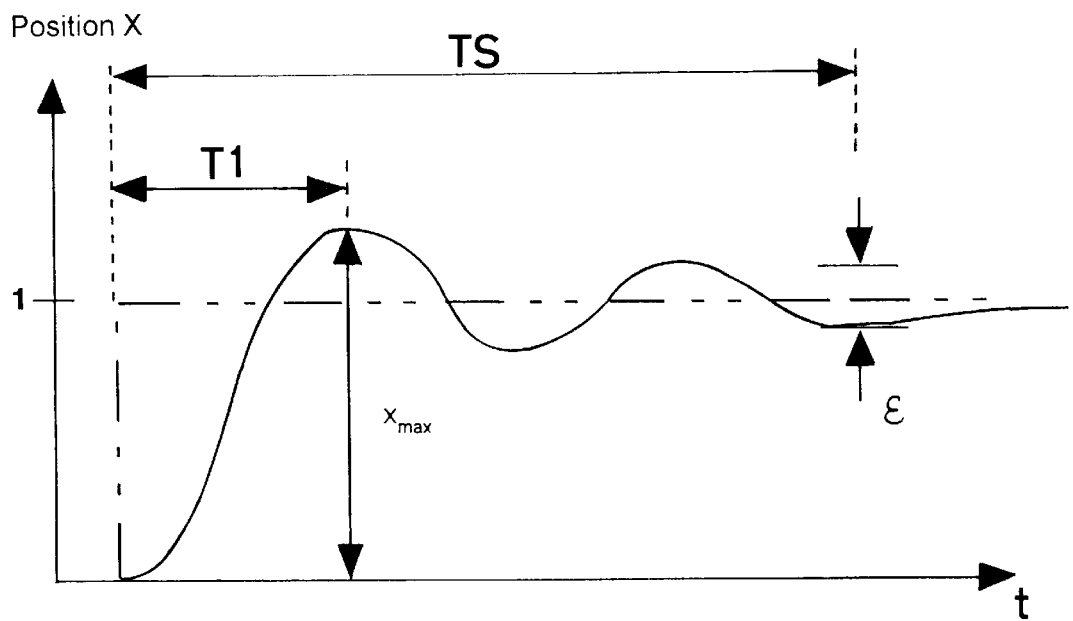
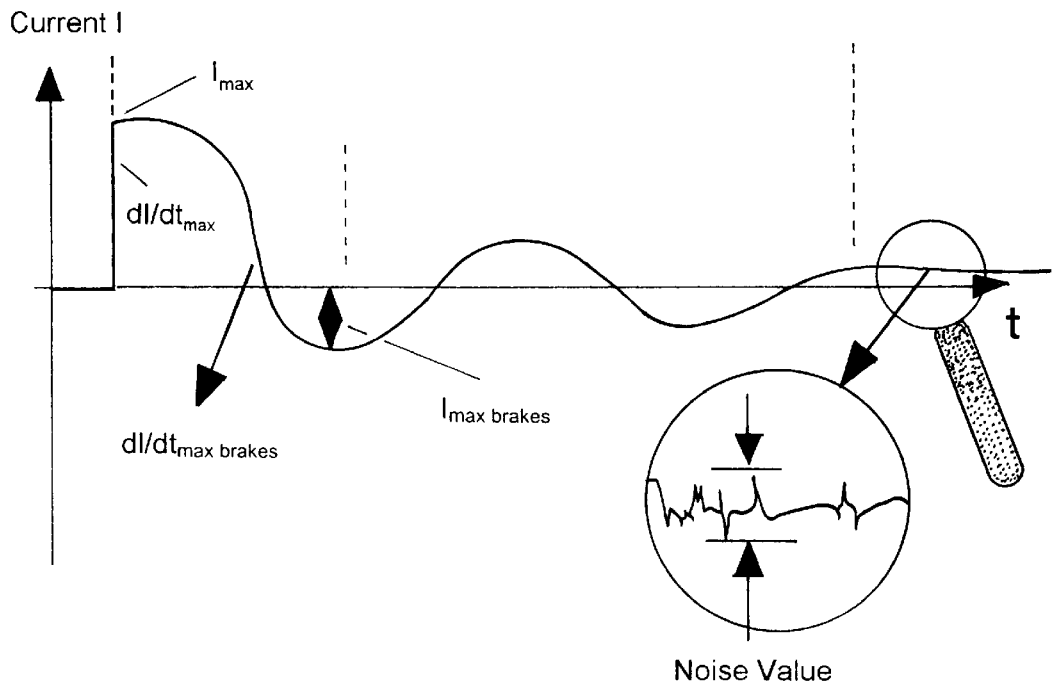
Fig. 3

ELECTROEROSION APPARATUS DRIVE CONTROL SYSTEM EMPLOYING FUZZY LOGIC

BACKGROUND OF THE INVENTION

1. Field of the Invention

The present invention relates to a method for tuning at least one controller parameter of a controller with at least one position, velocity and/or integral controller element for a control path, in particular for a drive in an electroerosion apparatus, via a fuzzy controller, wherein for the purpose of tuning a preset control input distribution, in particular a time-dependent distribution of the position of the drive, is provided to the controller as input variable and wherein at least one input variable of the fuzzy controller is derived from the control variable of the controller. The invention furthermore relates to a fuzzy controller designed to carry out a method of this type.

In addition, the invention relates to a controller with at least one position, velocity and/or integral controller element for a control path, in particular for a drive in an electroerosion apparatus, and to a corresponding fuzzy controller and a method for controlling a control path, in particular for a drive in an electroerosion apparatus, via a controller with at least one position, velocity and/or integral controller element. The invention also relates to the use of such a fuzzy controller.

2. Description of the Related Art

A fuzzy controller and a method of the type described above is known from EP-0 241 286 B1. The known fuzzy controller computes the difference between the measured controlled variable of the control path to be controlled and the control input provided to the controller in the form of an error signal wave form. From the error signal wave form the fuzzy controller derives characteristic variables which it uses subsequently for tuning the controller parameters. This fuzzy controller has the disadvantage that technical or technological limitations of the control path (e.g. an electric drive with an intermediate driver) are not taken into consideration. Consequently, the controller parameters tuned in the aforementioned manner can result in an undesirable nonlinear behavior of the controller.

It is the object of the invention to obviate these disadvantages.

The invention achieves this objective by the subject matter of each of the claims 1, 18, 21, 32 and 45. Additional embodiments of the invention are described in the dependent claims 2–17, 19, 20, 22–31 and 33–44.

SUMMARY OF THE INVENTION

Accordingly, in one of the generic methods at least one additional input variable of the fuzzy controller is derived from the controller output.

The controller to be controlled preferably includes a position (for proportional control), a velocity (for differential control) and an integrating controller element and will subsequently be called PIV controller. In specific embodiments, the controller to be controlled may comprise only a single control element, a pair or several control elements or, in addition to the aforementioned types of controller elements, other controller elements, such as a delay element and/or a dead-time element. The individual controller elements usually comprise one or more controller parameters for setting the control response of the corresponding controller element.

At its input the controller receives input variables, usually the preset control input and the (measured) controlled variable, and derives from these input variables a controller output which is supplied, via its output, as an output variable to a control path connected thereto. The controller may be analog or digital. If the controller is digital, then the control input distribution shall be defined as basically consecutive control input variables which are supplied to the input of the controller either continuously or in discrete time intervals (e.g. with the clock rate of a machine control (e.g. a computer numerical control, NC or CNC) where the method of the invention is preferably employed). The PIV controller including the control path will subsequently also be called a control system which exhibits a characteristic control behavior.

A fuzzy controller shall be defined as a controller which derives its controller output(s) from the controlled variable and the control input through computations based on so-called fuzzy logic. all together, there are provided two control loops wherein the first control loop comprises the PIV controller to be tuned and a given control path, and the second control loop comprises a fuzzy controller whose control path mainly comprises the PIV controller and the control path associated therewith.

The control path of the PIV controller preferably includes an electric or hydraulic drive for driving, for example, a mechanical unit (e.g. a guide head of an electroerosion machine). In the following, a driver stage required for driving an electric drive shall also form a part of the control path.

The tuning method of the invention has the advantage that for each control input distribution provided to the PIV controller, the controller output values supplied to the control path may be sized in such a way that, for example, the control path is—within the technical limits—always traversed in the linear region. The control path can then be operated within its technical limits, without the control system exhibiting non-linear control behavior. The tuning method of the invention consequently permits the use of inexpensive driver stages (servo amplifiers) for controlling the electric drive, since non-linear effects, such as saturation, current limits and the like, do not occur. Therefore, these driver stages can be rated to full capacity which is advantageous in comparison to using expensive driver stages which cannot be fully loaded and must always include a safety margin. The control system tuned by the method of the invention may advantageously be employed, as a result of its substantially linear control features, in multi-axis systems, in robotics, for precision machining and the like.

The advantage of using a fuzzy controller for tuning the control parameters is its robustness, its employability in very complex control systems which consequently are difficult to simulate, and its uncomplicated, "intuitive" programmability based on rules akin to the human thought process. The robustness is the result of the mainly non-linear control attributes which may be disadvantageous for controlling a drive system continuously, but which, on the other hand, minimize convergence problems in tuning the controller parameters as proposed herein.

Preferably, first the controller parameters of the velocity and position controller elements are tuned, followed by the controller parameters of the integrating controller element of the controller. Specifically, the velocity controller element determines the response time of the control system, whereas the integrating controller element is mainly used to overcome static and/or dynamic friction. Consequently, it is rather important in order to achieve short response times that the controller parameter of the velocity controller element are tuned as accurately as possible.

This is preferably accomplished by tuning the controller elements independently. Less preferred is a completely independent tuning of all three controller elements since especially the position and velocity controller elements mutually affect each other.

The controller parameters of the position and velocity controller elements of the controller are preferably tuned initially by way of a first control base without taking into account the technical limitations of the control path, especially of a driver (meaning, by only focusing on a desired (model) control behavior), and are subsequently adapted to these technical limitations by way of a second control base. In this way, a general (model) control behavior of the control system could advantageously first be taken into consideration in the first control base and the general control behavior would subsequently specifically adapted to the technical load capacity of the control path in the second control base, thus making programming particularly simple.

Preferably, physical quantities and system parameters, respectively, are derived from the controlled variable and/or the controller output which are then provided as input values for several or all control bases of the fuzzy controller. Physical quantities shall mean certain times, amplitude values or the like. The quantities advantageously permit a simple description of the control system, since these quantities also describe the control behavior of common control systems. Among those quantities are, for example, the response time, certain values of the overshoot of the actual position over the nominal position, sensitivity of the control system regarding changes in the actual values and/or noise values of the control system when stopped. In this way, the fuzzy rules can also be programmed very easily, since the programmer can at once evaluate the control behavior through these quantities which are characteristic for the control behavior, and can create appropriate rules for changing the controller parameters. The following quantities are preferably derived as input values of the fuzzy controller from the controlled variable of the controller: a first time until the controlled variable reaches a peak value, especially the first maximum; a first overshoot value which is correlated with the above peak value and/or with at least one of the subsequent peak values of the controlled variable; a second time until the controlled variable remains between preset limit values, especially limits linked to the control input distribution; and a (logical) value to indicate if the controlled variable had indeed overshot the control input (therefore indicating if the controlled variable exhibits aperiodic oscillations). In addition, there is deduced from the controller output: a peak value, a maximum change over time and a kind of noise value of the controller output. The kind of noise value indicates, for example, the maximum amplitude of idle oscillations or the like when the control system is stopped; in certain situations, the frequency content (frequency with the highest power density) may also be deduced from the positional distribution and used as a kind of noise value. The aforedescribed physical quantities permit a especially simple description of the control behavior of the control system. Especially the second time is a measure for the time required by the control system to reach the new nominal position (control input) within the given limit values. This second time will in the following also be referred to as settling time.

For the tuning process, there are preferably provided different control input distributions during consecutive tuning passes until a certain control input distribution—in the following called optimum control input distribution—satisfies the following criteria: the technical limits of the control path have been reached and/or the control behavior conforms to a given model (i.e. the measured physical quantities correspond to given desired values, e.g. the maximum change of the controller output over time reaches a preset maximum value). Subsequently, the following terms shall be used for describing tuning: a tuning process is the one-time tuning of all controller parameters (for this purpose, the PIV controller is preferably decoupled from the CNC, see below, or runs in multitasking mode quasi in parallel with the CNC), a tuning pass is the final tuning of one or several controller parameter(s) for a specific control input distribution, a tuning cycle is the one-time determination of a correction value for one or several controller parameter(s) or of one or several value(s) for the controller parameter(s) in response to an execution of a control input distribution and the final evaluation of the control attributes by the fuzzy controller. With the aforedescribed method, the programmer must preferably enter the limits for a linear response (i.e. the technical maximum values for the control path, such as the maximum velocity or maximum acceleration of a head system driven by electric motors, etc.) as well as the desired (model) control behavior of the closed-loop control system with respect to certain physical quantities (e.g. response time, overshoot, etc.), whereby the tuning automatically then takes the control behavior up to this extreme response of the control path into account and tunes the controller parameters accordingly.

Preferably, especially when tuning the position and velocity control element, two control input distributions having steps are selected for the tuning process in such a way that the first step height satisfies the criteria for an optimum control input distribution to a large degree and the second step height to a lesser degree. This advantageously speeds up the tuning process since advantageously only two tuning passes are required. Selecting the step height can be accomplished by the programmer if he/she understands the relationship between the maximum applicable step height and the corresponding maximum technical load capacity of the control path.

Preferably, the controller parameters are tuned in a way that the peak value and the maximum time dependence of the controller output do not exceed the preset maximum values, that the (logical) value indicates an overshoot of the controlled variable above the control input (i.e. there is no aperiodic limit) and/or that the first time until the controlled variable reaches its peak value, the first overshoot value, the second time until the controlled variable remains within given limits and the noise value are all minimized. With these tuning conditions, the programmer can advantageously graphically define the individual fuzzy rules of the fuzzy controller for the control behavior of the controller and evaluate the controller parameters accordingly. For example, a fuzzy rule may be defined such that it reduces the controller parameters in a situation where the peak value of the controller output would indicate that the technical limits of the control path are to be exceeded.

The overshoot value is preferably deduced from the first maximum and the first minimum of the control input, especially according to the following formula: overshoot value=1+(normalized height of the first maximum—normalized height of the first minimum)/2. Thereafter, an oscillatory behavior of the control system is advantageously also taken into account which is characterized by a slight overshoot of the controlled variable above the control input, but by a subsequent disadvantageously strong undershoot caused by a strong braking action. In this case, the controller parameters could be changed accordingly. For tuning the controller parameters of the integral controller, a two-step control input distribution is preferably selected, especially a two-step positional distribution for a drive. In general, the integral controller element is responsible for compensating for the dynamic and/or static friction. The static friction can have different effects depending on certain initial conditions for the control path. Consequently, the following situations in control paths having a drive coupled to complex mechanisms, such as a spindle drive, will have to be distinguished. In a first case, the mechanism is already biased in a specific direction by being driven in said direction, so that subsequently driving the mechanism in the same direction will require a lesser driving force than driving it in the opposite direction, since the friction is decreased. This can be advantageously taken into consideration in the preferred tuning method through a two-step control input distribution, since both cases—no change in direction between the first and the second step, but a change in direction between the second and the first step, if the drive is returned to its initial condition—are included in the tuning process. A good compromise is then reached for the control behavior in both cases—change in direction or no change in direction.

Preferably, the following input values of the fuzzy controller, especially for tuning the controller parameters of the integral control element, are derived from the controlled variable of the controller: a third time until the controlled variable remains between preset limits linked to the first step of the control input distribution; a forth time until the controlled variable remains between preset limits linked to the second step of the control input distribution; a second overshoot value correlated with the first peak value and/or subsequent peak values of the controlled variable during the first step of the control input distribution; and a third overshoot value correlated with the first peak value and/or subsequent peak values of the controlled variable during the second step of the control input distribution. With these tuning conditions, too, the programmer can advantageously graphically define the individual fuzzy rules of the fuzzy controller, especially for the control attributes of the integral controller, by taking into consideration the abovementioned cases of static friction and evaluate the controller parameters accordingly.

The controller parameters of the integral controller are preferably tuned in that the third and forth time are approximately of equal duration and/or the second and the third overshoot value are minimized. The first tuning condition advantageously achieves—as mentioned above—an identical control behavior for the two cases of static friction. The second tuning condition prevents the integral controller element from dominating and thereby causing the controlled variable to severely overshoot the control input. Overshoot shall be defined as the overshoot of the absolute value of the change in nominal position or control input in relation to the absolute value of the change in the control position which thus is independent of the direction of the change in position along a coordinate axis. This, of course, also applies to scalar controlled quantities, such as temperature or pressure measurements and the like, which may also be controlled via the PIV controller and the control path.

At the beginning of the tuning process, the controller parameters to be controlled are preferably set to values which are just large enough for the control path to be able to react to certain external forces, especially for a drive in the control path to be able to compensate for any forces exerted on the drive.

Further, a fuzzy controller is provided for tuning at least one controller parameter of a controller having at least one position, velocity and integral controller element for a control path, in particular for a drive in an electroerosion apparatus, comprising: a control input distribution transmitter coupled to the input of the controller and designed to provide a certain control input distribution, especially a time-dependent position distribution, as input value to the controller, and first means coupled to the output of the control path and designed to derive quantities from the controlled variable of the controller. The fuzzy controller of the invention is characterized in that second means are provided which are coupled to the output of the controller and designed to derive quantities from the controller output of the controller.

When a drive is included in the control path, there are preferably provided means for acquiring the position of the drive and/or means for acquiring the position of the mechanism driven by the drive, in particular a spindle, wherein said means are designed to provide the controlled variable. With the first alternative, the means for acquiring the position can also be used for acquiring the controlled variable, for example, for controlling the individual phases of the windings of a motor for an electric drive (brushless motor).

Further, there is provided a controller having at least one position, velocity and integral controller element for a control path, in particular for a drive in an electroerosion apparatus, and a fuzzy controller. The advantage of preferably using a controller with a position, velocity and integral controller element lies in its extraordinary robustness against changes in the external conditions and in its computational speed.

Preferably, the controller is characterized by an oversampling unit for the purpose of obtaining an n-fold oversampling of the control input supplied to the controller, wherein the position and/or velocity controller element and, if necessary, additional position and/or velocity controller elements are connected in series with the integral controller element in such a way that the accumulation of the integral controller element takes place based on the output values of the aforementioned controller element(s). As a result of the oversampling unit, the response time of the control system increases and the error induced by regulating the control path in a multi-axis system is reduced.

The controller preferably includes an anti-oversaturation unit for the integral controller element in order to prevent overdriving of the control path, wherein the anti-oversaturation unit is preferably designed in such a way that it compares the absolute value of the controller output to a preset maximum value for the control path and subtracts, if said value is exceeded, the contribution by the integral controller element from the controller output and/or reverses the last accumulation of the integral controller element. Thereby, the anti-oversaturation unit prevents an excessive accumulation in the integral controller element which would otherwise contribute an excessively large control contribution. Such a large accumulation occurs mainly when steplike control input distributions with large step heights are supplied to the PIV controller, causing the driver stage in the control path to be driven into saturation. As a result, the control system becomes nonlinear and possibly unstable.

Preferably, the controller is characterized by a correction unit for correcting the controlled variable and/or control input supplied to the input of the controller. The correction unit serves to correct mechanical inaccuracies of the control path. Mechanical inaccuracies may, for example, be caused by a drive bearing, a belt transmission and/or a spindle.

Further, a method is provided for controlling a control path, in particular for a drive in an electroerosion apparatus, via a controller having at least one position, velocity and integral controller element, characterized in that at least one controller parameter is tuned by a method according to the invention.

Further, the fuzzy controller is used according to the invention or the controller is used according to the invention in an electroerosion apparatus for controlling synchronized multi-axis systems. The controller or the fuzzy controller, as the case may be, is thus intended to be employed in a multi-axis systems where a predictable, linear and equally fast response for each axis is desired. Furthermore, all fuzzy controllers and controllers, respectively, for controlling the axes of a multi-axis system may be implemented in the same digital computer (processor), thereby advantageously relieving the CNC to which the multi-axis system is connected (the CNC is no longer required to compute interpolations of the multi-axis trajectories, the controller does this by itself) and providing a shorter response time for one axis with respect to the flow of information (warning messages, error reports, etc.) for the other axes and a simpler correction of errors caused by intersecting axes. If the controller is advantageously of a digital design, i.e. in the form of an algorithm, then all other functions required for controlling a multi-axis system can be carried out as easily, e.g. a safety check of the individual positions and velocities, interpolation of trajectories, data communication with the CNC and the like, etc. The digital embodiment has an advantage compared to the analog embodiment, in that it does not depend on the operating environmental and exhibits less problems relating to aging, drift and calibration issues.

The guide systems of electroerosion apparatus in particular require short response times for their control system, since the scan rates of the CNC are comparatively high in order to be able to monitor, control and regulate the erosion process in the most efficient way.

Further advantages and embodiments of the invention will become clear from the following description of preferred embodiments. In the specification, reference is made to the accompanying schematic drawing.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 3 as an example, is a time dependence of the controller output and of the controlled variable, as well as the physical quantities derived therefrom in response to an applied time-dependent control input distribution;

DETAILED DESCRIPTION OF THE PRESENTLY PREFERRED EMBODIMENTS

Figure 1:
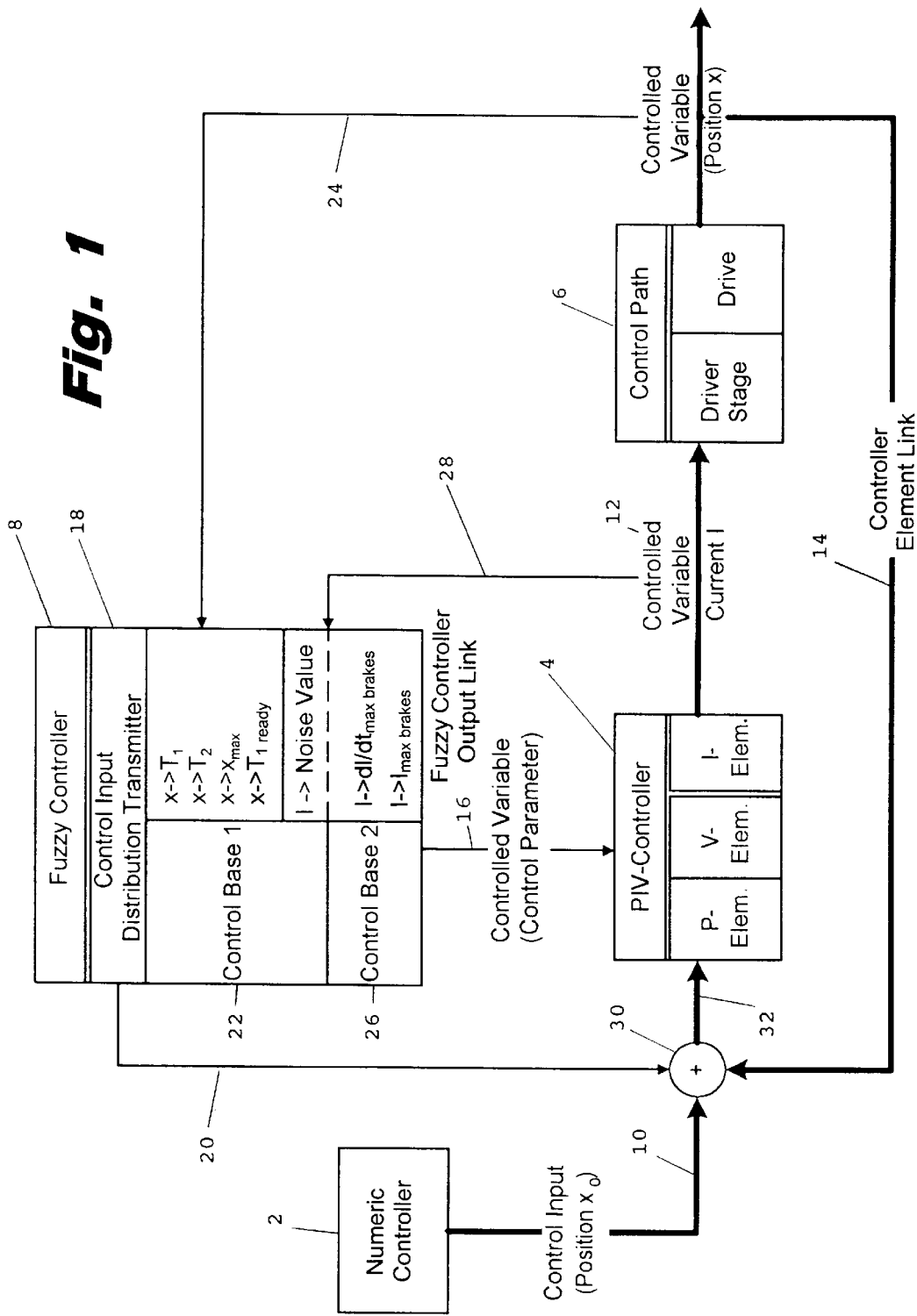
FIG. 1 is a schematic view of a control system including a fuzzy controller according to the invention for tuning a PIV controller.

FIG. 1 shows a schematic view of a control system comprising a numeric controller (CNC) 2, a PIV controller 4 and a control path 6, and a fuzzy controller 8 for tuning the controller parameters of the PIV controller 4. The output of the CNC 2 is connected via a control input distribution link 10 to the input of an adder 30 and via the output of the adder 30 via a link 32 to the input of the PIV controller 4, thereby providing a desired control input distribution to the PIV controller 4—or to the adder 30, respectively—via the "link" 10, 30 and 32. The output of the PIV controller 4 is connected via a controller output link 12 to the input of the control path 6 and provides the controller output to the control path 6 via this link 12. The output of the control path 6 is connected to another input of the adder 30 and thereby with the input of the PIV controller 4 via a controller element link 14 and provides the controlled variable to the PIV controller 4 via the "link" 14, 30 and 32 and the adder. The adder 30 is shown only symbolically in FIG. 1, since the difference (and also the sum) between the control input and the controlled variable may also the formed directly in the PIV controller 4.

For the purpose of tuning the controller parameters of the PIV controller 4, the output of the fuzzy controller 8 is connected to a separate input of the PIV controller 4 via a fuzzy controller output link 16. The fuzzy controller 8 provides the tuned controller parameters or correction values for the controller parameters, respectively, to the to the PIV controller 4 via this fuzzy controller output link 16.

The fuzzy controller 8 comprises a control input distribution transmitter 18 having its output connected to the adder 30 via another fuzzy control input distribution link 20 and thereby to the input of the PIV controller 4 via the link 32. The control input distribution transmitter 18 provides the PIV controller 4 via the "link" 20, 30 and 32 with a control input distribution which can be added, for example, in the adder 30 to the control input distribution provided by the CNC 2. The fuzzy controller 8 further comprises a first control base 22 with fuzzy rules, the "fuzzified" input values of which are partially derived from the measured controlled variable of the control path 6. To this end, the input of the fuzzy controller 8 is connected via a first link 24 to the output of the control path 6 or to a branch at the controlled variable link 14, as the case may be. In addition, the fuzzy controller comprises a second control base 26 with fuzzy rules, the "fuzzified" input values of which are derived from the controller output of the PIV controller 4. Therefor, the input of the fuzzy controller 8 is connected via a second link 28 to the output of the PIV controller 4 or to a branch at the controller output link 12, as the case may be. The first control base 22 also includes "fuzzified" input values derived from the controller output of the PIV controller 4. The values supplied to the input of the fuzzy controller 8 via the first link 24 and the second link 28 can therefore be regarded as two different controlled variables for the fuzzy controller 8.

The fuzzy controller 8 receives at its input the controller output of the PIV controller 4 and the controlled variable of the control path 6. From these two quantities, the fuzzy controller 8 derives certain physical quantities which are indicated in FIG. 1 and will be discussed in more detail hereinafter. It accepts these physical quantities as input values which are subsequently "fuzzified" in the form of fuzzy inputs. The fuzzy inputs are subjected to certain fuzzy rules, resulting in fuzzy outputs which are subsequently "defuzzified" into output values. These output values are either controller parameters of the PIV controller 4 to be tuned or correction values for these controller parameters.

The PIV controller 4 comprises individual position, velocity and integral controller elements, in the following also called P, V, and I elements. The controller parameters of the individual controller elements may, for example, be tuned separately or in combination. As is indicated in the embodiment shown in FIG. 1 by the symbolic separation of the P and the V controller elements from the I controller element, the controller parameters of the P and the V controller elements are tuned simultaneously, but separately from the controller parameter of the I controller element. Such a separate tuning indicates that the controller parameters of the P and the V controller elements are tuned in a first tuning step, in which step the controller parameter of the I controller element is, for example, held constant. Subsequently, in a second tuning step, the tuned values of the controller parameters of the P and the V controller elements are held constant and the controller parameter of the I controller element is tuned.

The most critical nonlinearities in a control loop are usually the result of the technical limits of the control path 6. The control path 6 comprises, for example, a driver stage (e.g. a 4-quadrant driver) for driving a drive to be supplied with electric power. An ideal driver stage for the control path 6 should be capable of supplying infinite current. Real driver stages, however, are limited by the finite current which can be generated and which depends on their output transistors (MOSFET's, IGBT'S, etc.) and on their internal power supplies. In addition, an ideal driver should be capable of supplying current to any load (e.g. the drive) coupled to it, independent of the required voltage. Real drivers, however, are limited by the maximum voltage which can be generated and which usually corresponds to their internal supply voltage (also called bus voltage). Consequently, a real driver has a limited operating range with respect to current and voltage and thus exhibits nonlinear behavior within these limits. Therefore, the control path 6 is also nonlinear within these limits.

In the following, the dependence of the current limit of the driver stage on the load type coupled thereto will be described: With a substantially resistive load type, the current is limited to the value:

$$I_{Load} U_{Bus}/R_{Load}$$

With a substantially inductive load type, the maximum achievable change of the current with time is limited to the value:

$$dI_{Load}/dt = U_{Bus}/L_{Load}$$

If the driver stage supplies, for example, a time-dependent current in form of a sine wave, then the maximum achievable change of the current with time decreases with increasing frequency of the current.

For a resistive load, the internal supply voltage $U_{Bus}$ of the driver stage will have to be just large enough so that the maximum current limited by the resistive load can flow. If the load is, for example, a DC motor or a brushless motor, then there is an additional voltage drop from the voltage induced in its windings and from the inductance of the motor winding. As a result, the voltage present at the terminals of the motor is the sum of the following voltage drops across the motor:

$$U_{terminal} = U_{ind.} + L\, dI/dt + R\, I$$

The induced voltage is hereby proportional to the motor speed. When the frequency of a, for example, sinusoidal supply voltage increases, the maximum terminal voltage $U_{terminal}$ necessary to achieve a current flow I also increases since, on one hand, the induced voltage resulting from the higher motor speed and, on the other hand, the voltage drop in the inductance of the motor winding all increase. The terminal voltage $U_{terminal}$ which can be supplied to the motor by the driver stage, cannot be larger than the internal supply voltage $U_{Bus}$ due to the technical limitations of the driver stage. If the required terminal voltage $U_{terminal}$ is larger than the maximum voltage $U_{Bus}$ which can actually be supplied, then the required current is cut off. In summary, the load current is mainly cut off at high frequencies and at high current amplitudes, since the current change as a function of time is particularly large under these conditions. Consequently, large currents are "filtered" to a greater extent than small currents. The transfer function of the control system then becomes nonlinear and is dependent on the value of the controller output and on the current to be supplied to the control path.

Figure 2:
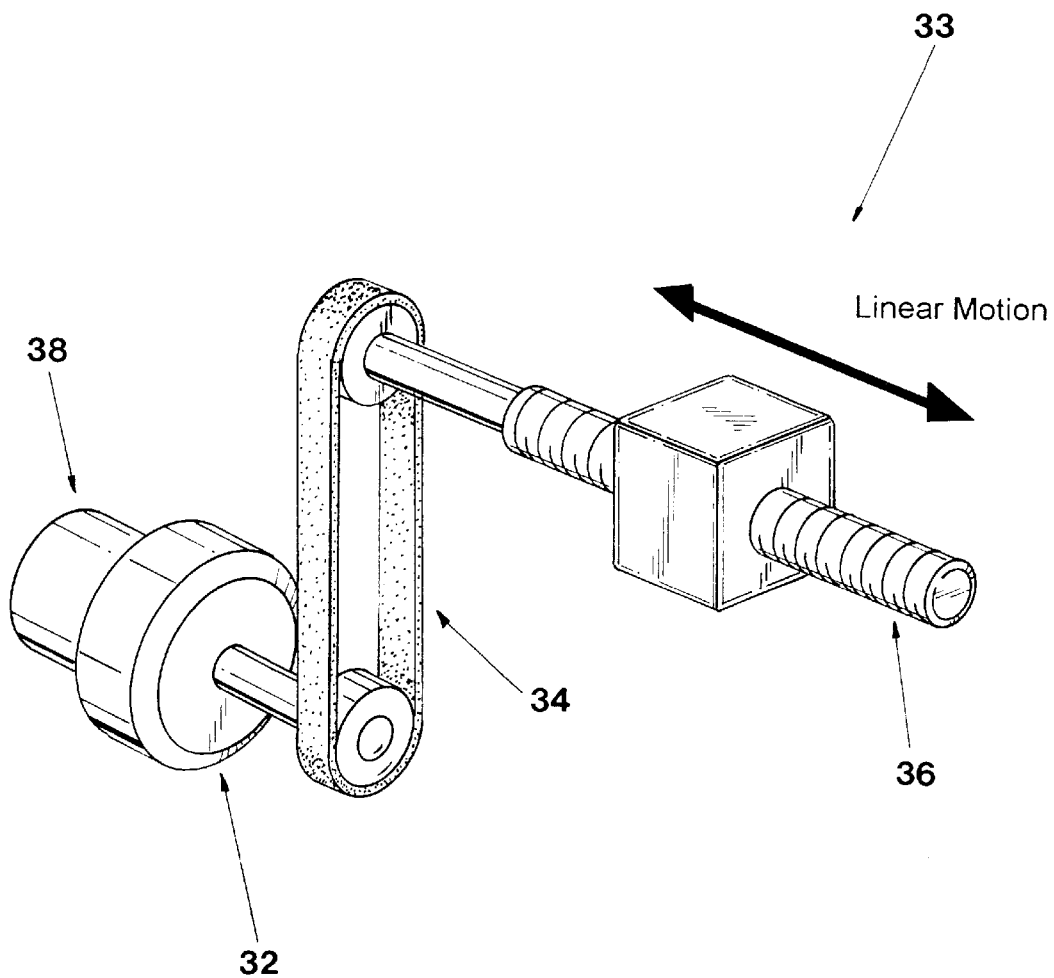
FIG. 2 is a schematically, an embodiment of a drive included in the control path of the PIV controller with attached mechanism.

FIG. 2 shows schematically an embodiment of a drive 33 being part of the control path 6 and having a mechanism coupled to it. The drive 33 drives, for example, a spindle 36 via a belt transmission 34, such that a member movably guided on the spindle executes a linear motion. This member may, for example, be the guide head or the machine table of an electroerosion machine. For this type of machines in particular, a high accuracy for positioning the guide heads is required.

These machines are frequently designed as multi-axis systems. In these multi-axis systems, for example, a guide head is guided by several drive systems of this type along different coordinate axes or tilted or turned with different angles, as the case may be. The accuracy of each drive is especially important when guiding along coordinate axes which are perpendicular to each other, since an error in one drive resulting from alignment errors of one axis may also affect the position along the coordinate direction of another axis.

The drive 33 is coupled to, for example, an optical sensor system 38 (e.g. a rotation encoder) which determines the position or orientation, respectively—meaning the controlled variable—of the drive 33. Furthermore, either alternately or in addition, a sensor system (not shown) may be directly secured to the spindle 36 or the guided member, as the case may be, for directly determining the position of the member and thereby taking already into consideration the inaccuracies of the belt transmission 34 and the spindle 36. Such multi-axis systems or spindle drives, respectively, require a rapid dynamic response time, minimum overshoot of the controlled variable over the control input, short control times, high position accuracy, reasonable insensitivity against load changes, reliable compensation against friction and a small position noise when stopped, as well as mutually coordinated dynamic properties of the individual axes.

It should be mentioned that the PIV controller 4 can also be used in conjunction with motors other than brushless motors, e.g. with DC motors, asynchronous motors, stepping motors, reluctance motors, etc.

In the upper diagram of FIG. 3, there is shown a time dependence of the control input (shown as a broken line) and a time dependence of the controlled variable (shown as a solid line). The time dependence of the control input distribution and of the controlled variable are illustrated in this embodiment for consecutive positions, such as for an axis system having an electric drive. The lower diagram shows a corresponding dependence of the controller output which—in this example—consists of consecutive current values for the driver stage of the electric drive. In the upper diagram, the positional values of the controlled variable are normalized to the positional values of the control input. The control input distribution of FIG. 3 exhibits a step-like structure.

As mentioned above, the fuzzy controller 8 derives physical quantities from the measured and/or computed controller outputs and controlled variables and uses these variables as input values for its control bases 22 and 26. The physical quantities are already indicated in the graphic representation of the fuzzy controller 8 in FIG. 1 and will now be discussed in more detail with reference to FIG. 3.

The first derived physical quantity is the normalized value of a first maximum $x_{max}$ of the position dependence. The position dependence assumes this maximum value $x_{max}$ only after the controlled variable has overshot the control input. If the controlled variable always remains below the control input, then this situation is called an aperiodic limit which usually entails long recovery times. This limit should, however, be avoided by selecting the controller parameters accordingly. For this purpose, the fuzzy controller 8 derives from the dependence of the controlled variable a second internal logical value $T_{1\ ready}$ (not shown) which indicates if an overshoot condition has occurred or not (aperiodic limit).

The third physical quantity is a time duration $T_1$, which indicates the elapsed time from the step in the step-like control input distribution until the controlled variable reaches its first maximum $x_{max}$.

The third physical quantity is a settling time $T_S$, which indicates the elapsed time from the step in the step-like control input distribution until the time when the absolute value of the controlled variable remains within a given limit $\epsilon$ around the (in this case constant) control input distribution. The settling time $T_S$ thus indicates when the drive is at rest within a given required accuracy. The limit $\epsilon$ may be chosen arbitrarily. For the selection of $\epsilon$, the mechanical properties of the control path 6 or the oscillatory behavior of the entire control system may be taken into consideration. Preferably, the value for $\epsilon$ has to be selected in such a way that, on one hand, the desired positional accuracy is achieved and, on the other hand, the time period $T_S$ and thereby the recovery times are sufficiently short in order to achieve a fast response time of the control system. For $\epsilon$, preferably a value of $\pm-5\%$ of the control input is selected. The position dependence X (t) is continuously measured, for example, by using the sensor system 38 associated with the drive 33.

The fuzzy controller 8 derives the additional physical quantities from the controller output dependence shown in the lower part of FIG. 3 (shown as a solid line). The PIV controller 4 provides the time dependence of the controller output to the control path 6 by taking into consideration the time dependence of the control input (shown as a broken line) and with the control loop closed. The controller output in this embodiment is a current value computed by the PIV controller 4 which is supplied, for example, to the driver stage included in the control path 6. The values for the current are already available as computed values, but could also derived from a current flowing through the controller output link 12 which can be measured.

If the control input distribution supplied to the PIV controller 4 is step-like and sufficiently large, then the current value supplied to the control path 6 by the PIV controller 4 at the time when the step occurs, corresponds to the maximum current $I_{max}$ which can be generated by the driver stage. This jump from a zero current to $I_{max}$ corresponds to an infinitely large dI/dt. For technical reasons, the driver stage is only capable of supplying a certain (finite) dI/dt. The resulting overdriving and concurrent nonlinearity of the entire control path is tolerated during the acceleration phase (corresponds to the time interval during which the current is larger than zero), since this provides the optimum response time. As described below, it is important for the behavior of the control system that $I_{max}$ and $d/dt_{max}$ are only not exceeded during the braking phase (corresponds to the time interval during which the current I is less than zero). After the acceleration phase the braking phase is initiated. For this purpose, the current is preferably reduced at the beginning and subsequently the polarity of the current is reversed in order for the drive 33 to be decelerated when the controlled variable overshoots the control input. This overshoot, however, is—as mentioned above—desirable in order to avoid the aperiodic limit. The maximum current during the braking phase $I_{max\ brakes}$ must, however, not exceed the maximum current $I_{max}$ and should advantageously always remain somewhat below this value, so that the driver stage can safely function in the linear region. Should the driver current become saturated during the braking phase—i.e. the computed value for $I_{max\ brakes}$ is larger than the maximum current $I_{max}$ which the driver stage is able to generate—then an undesirable severe overshoot of the controlled variable over the control input can occur, since the drive 33 cannot be sufficiently decelerated as requested by the controller. The result are disturbing oscillations in the position of the drive 33.

The maximum change in current with time occurs when the full supply voltage $U_{Bus}$ is applied to the inductance L of the motor. This occurs (assuming a small resistance R) when the transistors of the power stage are fully conducting and the motor is stopped ($U_{ind}=0$, cf. formula on page 18). Under this condition, the maximum change in current with time is:

$$dI/dt_{max}=U_{Bus}/L,$$

where $U_{Bus}$ is the internal supply voltage of the driver stage and L is the combined inductance of the driver stage and the drive 33. It has to be ensured that the maximum desired change in current with time $dI/dt_{max}$ to be applied to the control path will never exceed this value. Otherwise, the current would be cut-off since the control path 6 will not be able to receive the applied current and consequently the response function of the control system would become nonlinear.

It should be stated that the conditions derived above are only valid for the case where the drive 33 is stopped and thus the induced voltage $U_{ind}$ is zero. If the drive 33 is not stopped, then the maximum possible applicable change in the current with time $dI/dt_{max}$ is even smaller since the maximum terminal voltage $U_{terminal}$ is merely the difference between the internal supply voltage of the drivers $U_{Bus}$ and the induced voltage $U_{ind}$.

In FIG. 3, the maximum increase in current $dI/dt_{max}$ in the acceleration phase is shown as a vertical line, although in reality it is a steep straight line. If the step or the increase of the step-like control input distribution is large, then the maximum current $I_{max}$ which can be generated by the driver stage, is also reached when the maximum increase in the current $dI/dt_{max}$ is taken into account. This is advantageous for keeping the response times short. If the step height is not large enough, then the maximum current during the acceleration phase may stay below $I_{max}$.

Especially for a drive 33 having a spindle drive coupled to it, control parameters can advantageously always be found wherein for maximum acceleration current $I_{max}$ during the acceleration phase there is always a smaller maximum braking current $I_{max\ brakes}$ during the braking phase sufficient to control the control system in a stable fashion. The PIV controller 4 may also supply a maximum current value $I_{max}$ during the acceleration phase which exceeds the technical limits of the driver stage (this applies also for the maximum change in current with time). The resulting saturation of the driver stage and the concurrent nonlinearity of the control system may be tolerated during the acceleration phase, if at the same time the braking phase pertinent for the control behavior remains unaffected.

Usually, the PIV controller 4 selects the maximum change in current with time $dI/dt_{max}$ and the maximum current $I_{max}$ during the acceleration phase, so that the technical limits of the driver stage and the drive 33 are almost reached. The subsequently derived values for $I_{maxbrakes}$ and $dI/dt_{max\ brakes}$ are not supposed to reach the technical limits, i.e. for all possible control input distributions they should be smaller than the maximum values $I_{max}$ and $dI/dt_{max}$ which can be supplied by the driver. This applies especially to the case where the step-like control input distribution has its largest step height. During tuning of the controller parameters it is, however, sufficient to ensure that this condition is satisfied for a control input distribution with such a step height, that the drive powered by the driver stage attains its maximum intended speed.

In addition, a kind of noise value is deduced from the time dependence of the current which indicates how "nervous" the control system is. The noise value may become extremely high if the controller parameter of the V control element of the PIV controller 4 is too high. The noise value is deduced only from the current contributions of the P and V control element of the PIV controller 4, for example, as the difference between the largest and the smallest current value of the current contributions of the P and V control element during a given time after the end of the settling time $T_S$, i.e. when the drive 33 is stopped. In a similar fashion, the noise value may also be derived from the measured time dependence of the position. Until now, only current limits were considered. However, voltage limits will also have to be taken into consideration since they limit the maximum speed of the drive 33. This is the responsibility of the CNC 2 in FIG. 1, which should supply to the PIV controller 4 only those time-dependent changes in position and thereby also speed changes which do not exceed the technical limits of the driver stage (internal supply voltage $U_{bus}$). If the CNC 2 observes these limits on its own, then it is sufficient for the PIV controller 4 to work within the given maximum speed interval without saturating the drive stage.

When the controller parameters are tuned, one may, for example, start with a small step height and increase this step height until the drive 33 attains its maximum desired speed during the acceleration phase. The controller parameters obtained from tuning with the maximum step height can then be used for any smaller step height. On the other hand, an approximate value may be set for that maximum step height at which the expected maximum speed of the drive 33 known from the technical data of drive 33 is not reached quite yet.

The same requirement applies to the maximum acceleration of the drive with an attached mechanism. This can be taken into consideration in the same fashion as described above for the maximum speed.

The values for the speed and acceleration can be derived from the measured position—the controlled variable. In addition, it should be stated that the linear response of a control system can be checked rather easily since the time dependence of the controller outputs in response to step-like control input distributions is similar (mainly proportional) to the time dependence of the controller outputs in response to control input distributions of various forms. It is therefore sufficient to ensure that the time dependence of the controlled variables in response to step-like control input distributions with different step heights, especially during deceleration, have a similar dependence.

So far, only step-like control input distributions have been discussed. During spark erosion processing, however, ramp-like control input distributions are more frequently encountered. With ramp-like control input distributions, a jump in speed occurs at the beginning and at the end of the ramp, whereas during the ramping the position changes at a constant speed. It can be shown through a mathematical Laplace transformation that the dependence of the controlled variable on speed for ramp-like control input distributions is similar to the dependence of the controlled variable on the position for step-like control input distributions. As a result, a reliable time dependence of the speed is automatically obtained for a ramp-like control input distribution, if a reliable time dependence of the position was previously obtained for a step-like control input distribution.

In summary, the fuzzy controller 8 of FIG. 1 tunes the controller parameters of the PIV controller 4 by taking into consideration the linearity of the control behavior by tracking the values $I_{max-brakes}$ and $dI/dt_{max-brakes}$ for step-like control input distributions for which the speed and the acceleration of the drive 33 is varied between zero and the maximum value. The controller parameters are then tuned so that the previously computed current values $I_{max}$ and $dI/dt_{max}$ are never exceeded during the deceleration (braking) phase. At the same time, the PIV controller 4 attempts to minimize the values $X_{max}$, $T_1$ and $T_S$ as well as the noise value or to approximate these values with preset model parameters in order to prevent an aperiodic limit (see above).

It should be mentioned that the values $I_{max-brakes}$ and $dI/dt_{max-brakes}$ may also be calculated analytically if the response function of the PIV controller 4 and the maximum allowable drive speed and acceleration are known. In order to keep the process economical, the physical quantities $X_{max}$, $T_1$ and $T_S$ and the noise value as well as the values $I_{max\text{-}brakes}$ and $dI/dt_{max\text{-}brakes}$ are, in the present example, derived directly from the dependence of the controller outputs and the controlled variables.

The fuzzy controller 8 of FIG. 1 tunes the controller parameters of the PIV controller 4 in two tuning steps: in the first tuning step, the controller parameters of the P and the V control elements of the PIV controller 4 are tuned and in the second step the parameters of the I control element are tuned. In these two steps, tuning is in principle similar: The control input distribution transmitter 18 supplies a step-like control input distribution to the PIV controller 4. The fuzzy controller 8 subsequently derives in real time (or by multitasking) the physical quantities from the controller output and the controlled variable. As soon as the drive 33 stops (or the settling time $T_S$ has exceeded a maximum given time period during which the drive 33 has not yet stopped), the two control bases 22 and 26 of the fuzzy controller 8 are supplied with the derived physical quantities. The "defuzzified" output values derived from the control bases may, for example, be correction values $dK_P$, $dK_V$, $dK_1$ for the controller parameters $K_P$, $K_V$, $K_1$ corresponding to the individual control elements of the PIV controller 4. The new controller parameters $K_{P(new)}$, $K_{V(new)}$, $K_{1(new)}$ may then be computed from the previously determined (old) controller parameters $K_{P(old)}$, $K_{V(old)}$, $K_{1(old)}$ in the following way:

$$K_{P(new)}=(1+dK_P)*K_{P(old)} \quad K_{V(new)}=(1+dK_V)*K_{V(old)} \quad K_{I(new)}=(1+dK_I)*K_{I(old)}$$

The old controller parameters $K_{P(old)}$, $K_{V(old)}$ and $K_{1(old)}$ of the PIV controller 4 are now replaced by the new controller parameters $K_{P(new)}$, $K_{V(new)}$ and $K_{1(new)}$ and the tuning cycle is repeated. This process will be performed until an optimum dependence of the controller outputs and controlled variables with respect to a given model is obtained.

Figure 4:
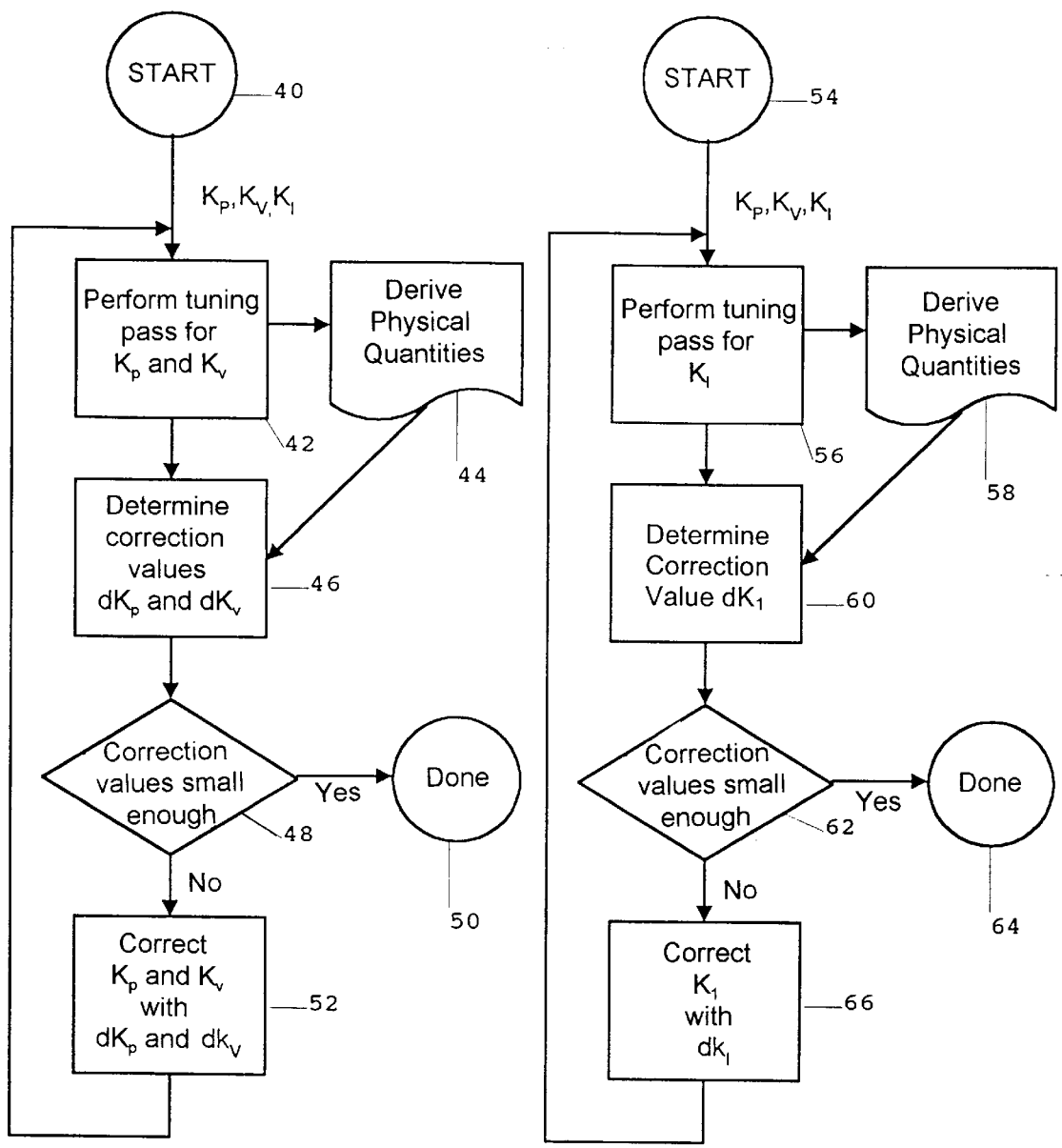
FIG. 4 separately, is a flow diagram for the tuning sequence for the P and V elements as well as for the I element of the PIV controller.

FIG. 4 shows two flow diagrams 40 and 54 which illustrate a tuning cycle during the first and the second tuning step, respectively, of the tuning process.

The flow diagram 40 on the left shows a tuning cycle for the first tuning step for tuning the controller parameters $K_P$ and $K_V$ of the P and V controller element. During the first tuning step, the controller parameter $K_I$ of the I controller element is preferably held constant at a value which allows the influence of the I controller element to be just large enough so that the drive 33 is capable of supporting static loads or the like.

A tuning pass is performed in a first step 42 wherein the control input distribution transmitter 18 supplies, for example, a step-like control input distribution to the input of the PIV controller 4. The PIV controller 4 controls the control path 6 through the present controller parameters $K_P$, $K_V$ and $K_I$, in such a way that they conform with the applied time-dependent control input distribution. In a step 44 carried out in parallel with step 42, the abovementioned physical quantities are derived from the computed (or possibly also measured) dependence of the controller output and the measured dependence of the controlled variable and provided to the fuzzy controller 8 for tuning of the controller parameters $K_P$ and $K_V$. After the tuning pass is concluded, the fuzzy controller 8 determines the correction values $dK_P$ and $dK_V$ in a step 46. These correction values $dK_P$ and $dK_V$ are subsequently checked in a step 48 to determine if they are small enough and if it can thus be assumed that the previous controller parameters $K_P$ and $K_V$ were adequately tuned. If the correction values $dK_P$ and $dK_V$ are small enough, then the process branches to step 50 and the tuning cycle is concluded. Otherwise, the process branches to step 52 where the controller parameters $K_P$ and $K_V$ are corrected using the correction values $dK_P$ and $dK_V$. Then the process jumps back from step 52 to the step 42 and the flow cycle is executed again.

Figure 5:
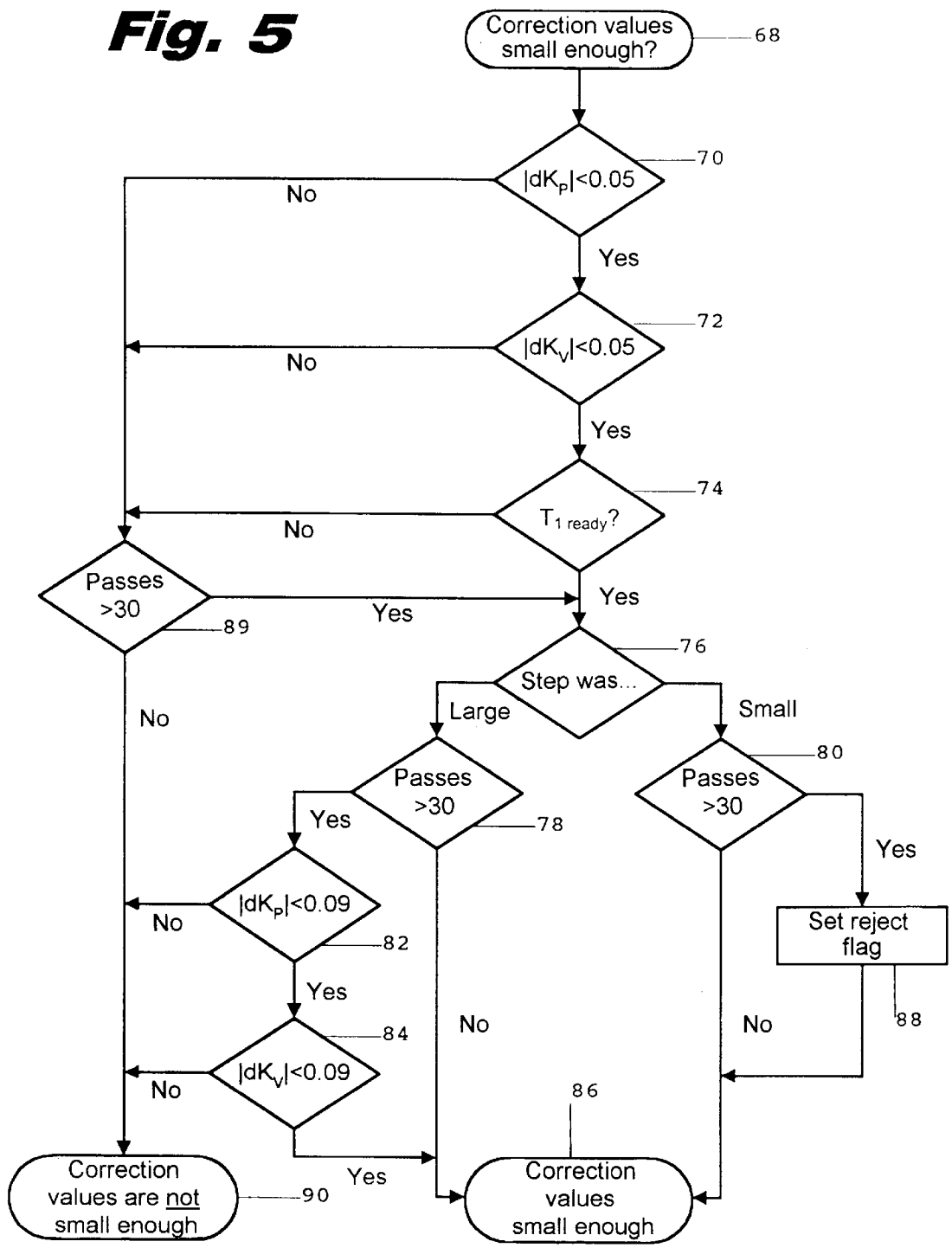
FIG. 5 is a flow diagram for a termination algorithm to indicate when the controller parameters of the P and V elements are adequately tuned.

The flow diagram 54 on the right shows a tuning cycle for the second tuning step for tuning the controller parameter $K_I$ of the I controller element. In a first step 56, a tuning pass is executed wherein the control input distribution transmitter 18 supplies, for example, a two-step control input distribution to the input of the PIV controller 4. In a step 58 carried out in parallel with step 56, the abovementioned physical quantities are derived from the computed (or possibly also measured) dependence of the controller output and the measured dependence of the controlled variable and provided to the fuzzy controller 8 for tuning of the controller parameter $K_I$. After the tuning pass is concluded, the fuzzy controller 8 determines the correction value $dK_I$ in a step 60. The correction value $dK_I$ is subsequently checked in a step 62 to determine if it is small enough and if it can thus be assumed that the previous controller parameter $K_I$ was adequately tuned. If the correction values $dK_I$ is small enough, then the process branches to step 64 and the tuning cycle is concluded. Otherwise, the process branches to step 66 where the controller parameters $K_I$ is corrected using the correction value $dK_I$. Then the process jumps back from step 66 to the step 56 and the flow cycle is executed again. FIG. 5 shows a flow diagram for a decision algorithm 68 that decides if a tuning cycle is concluded, i.e. if the correction values $dK_P$ and $dK_V$ are small enough. For this purpose, it is checked in a first step 70 if the correction value $dK_P$ for the controller parameter $K_P$ is smaller than a given value (here 5%). If this is not the case, the process branches to a step 89. Otherwise, the process branches to a second step 72 where it will be checked if the correction value $dK_V$ for the controller parameter $K_V$ is smaller than a given value (here 5%). If this is not the case, the process branches to step 89 where it is checked if the logical value $T_1$ ready indicates an overshoot of the controlled variable above the control input. If this is not the case, the process branches to step 89, otherwise to a fourth step 76. In step 89 it is checked if the number of tuning cycles has exceeded a preset value (here 30). If this is the case, then the process branches to the fourth step 76, otherwise to a step 90.

In the fourth step 76, it is checked if a step-like control input distribution having a large or a small step is applied. Preferably, the entire tuning process of the P and V controller elements is first carried out using small steps and subsequently with large steps. If the step is large, then the process branches to a fifth step 78, where it is checked if the number of tuning passes has exceeded a preset value (here 30). If it is determined in the fifth step 78 that the number is greater than 30, then the process branches to a step 86. Otherwise, the process branches to a seventh step 82 where it is checked if the correction value $dK_P$ is smaller than a preset value (here 9%). If it is determined in the seventh step 82 that $dK_P$ is smaller than 9%, then the process branches to an eighth step 84 where it is checked if the correction value $dK_V$ is smaller than a preset value (here 9%). Otherwise, the process branches to a step 90. If it is determined in the eighth step 84 that $dK_V$ is smaller than 9%, then the process branches to step 86, otherwise to step 90. If, on the other hand, the step is small, then the process branches to a sixth step 80 where it is checked if the number of tuning passes has exceeded a preset value (here 30). If it is determined in the sixth step 80 that the number of the tuning passes has exceeded a preset value (here 30), then the process branches to a ninth step 88, otherwise to step 86. In the ninth step, a so-called Reject Flag is set which is supposed to indicate that the corrected controller parameters $K_P$ and $K_V$ should be rejected and be replaced by their initial values. The algorithm proceeds from the ninth step 88 to step 86. In step 90, the decision algorithm conveys the information to the controlling algorithm 40 that the correction values $dK_P$ and $dK_V$ are not yet small enough and that the tuning process is therefore not yet concluded. In step 86, on the other hand, the decision algorithm conveys the information to the controlling algorithm 40 that the correction values $dK_P$ and $dK_V$ are small enough and that the tuning cycle can be concluded.

At the end, the results from the tuning processes performed with the different step heights are compared and the appropriate controller parameters $K_P$ and $K_V$ are derived therefrom. If the Reject Flag was set, then the results from the tuning processes performed with the small step are accepted.

Figure 6:
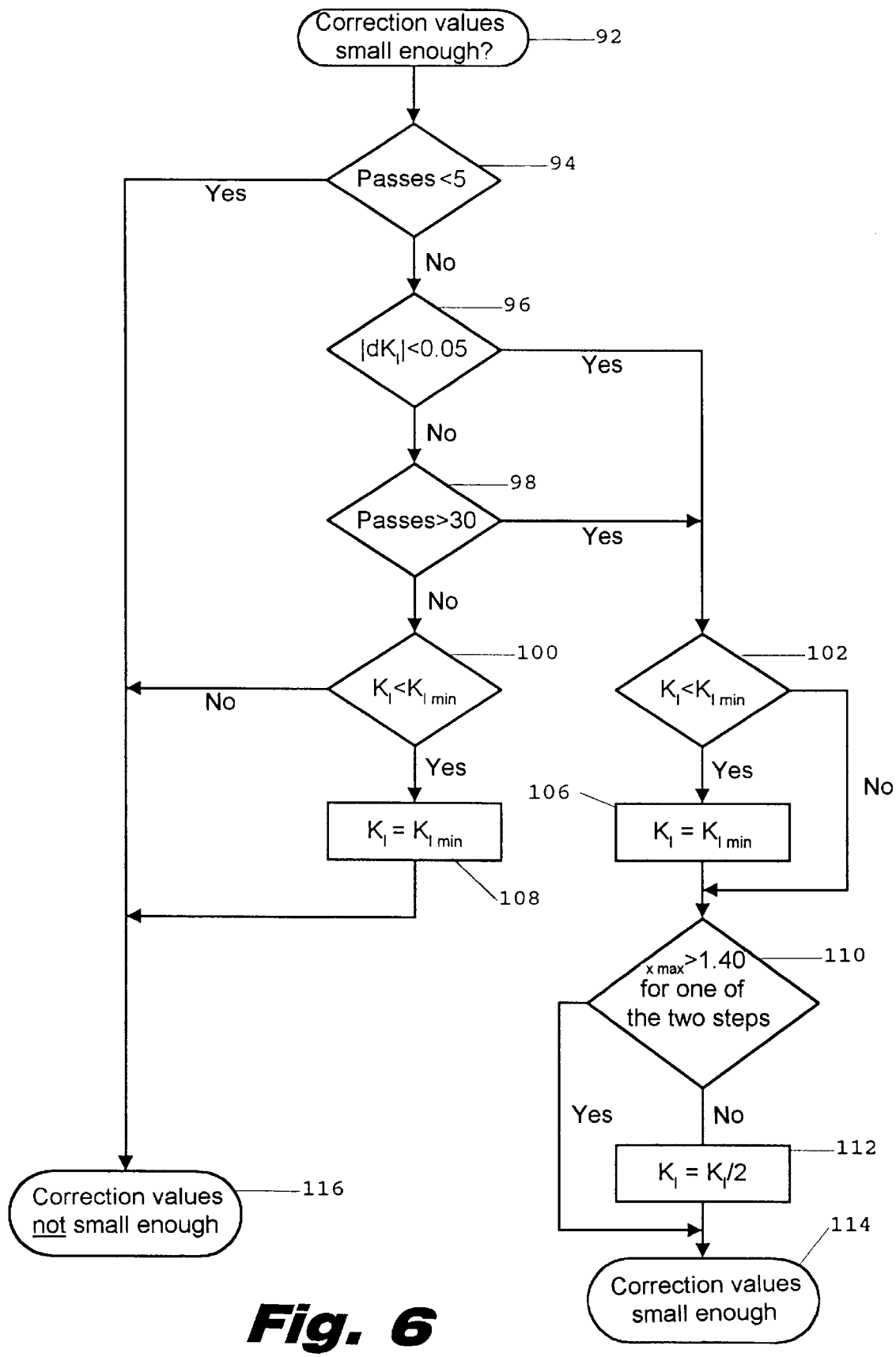
FIG. 6 is a flow diagram for a termination algorithm to indicate when the controller parameters of the I element are adequately tuned.

FIG. 6 shows a similar flow diagram for a decision algorithm 92 which is used for tuning of the I controller. This algorithm decides if the tuning cycle can be concluded or not, i.e. if the correction value $dK_I$ is small enough. For this purpose, it is checked in a first step 94 if the number of tuning passes is smaller than a preset value (here 5). If this is the case, the process branches to a step 116, otherwise to a second step 96. This query is intended to ensure that for safety reasons a minimum number of tuning passes are executed under any circumstances. In the second step 96 it is checked if the value of the correction value $dK_I$ is smaller than a given value (in the present example 5%). If this is the case, the process branches to a sixth step 102. Otherwise, the process branches to a third step 98 where it is checked if the number of tuning cycles has exceeded a preset value (in the present example 30). If this is the case, the process branches to the sixth step 102. If this is not the case, the process branches to a fourth step 100 where it is checked if the value of the controller parameter $K_I$ is smaller than a minimum initial value for the controller parameter $K_{I\ min}$ ($K_{I\ min}$ is the minimum initial value for the controller parameter $K_I$ which is selected by the user such that the drive is capable of supporting, if necessary, static loads). If this is not the case, the process branches to a the step 116. Otherwise, the process branches to a fifth step 108 where the value of the controller parameter $K_I$ is set to the minimum initial value for the controller parameter $K_{I\ min}$. This ensures that the controller parameter $K_I$ never falls below the minimum initial value $K_{I\ min}$ where potentially loads are no longer supported.

The programs runs from the fifth step 108 to step 116. In the sixth step 102 it is checked if the value of the controller parameter $K_I$ is smaller than the minimum initial value $K_{I\ min}$. If this is not the case, the process branches to an eighth step 110. If this is the case, then the process branches to a seventh step 106 where the values of the controller parameter $K_I$ are set to the minimum initial value $K_{I\ min}$ (see above). From there the program proceeds to the eighth step 110, where it is checked if the overshoot value $x_{max}$ of the positional distribution over the (possibly two-step) control input distribution (see below) provided to the PIV controller 4 for tuning the controller parameters $K_I$ of integral controller element is larger than a preset value (in the illustrated example 40% larger than the corresponding control input value). For a two-step control input distribution, the larger value of the two maximums $x_{max1}$ and $x_{max2}$ is selected as the overshoot value $x_{max}$ (see below). If the overshoot value $x_{max}$ is larger than the preset value, then the program branches to a step 114. Otherwise, the program branches to a ninth step 112 where the value of the controller parameter $K_I$ is set to half its value. Thereby, an excessive overshoot caused by the integral controller element is prevented (providing safety, but also supplementing the fuzzy rules which are already intended to prevent a severe overshoot). From the ninth step 112, the program proceeds to step 114. In step 116, the decision algorithm conveys the information to the controlling algorithm 54 that the correction value $dK_I$ and $dK_V$ is not yet small enough and that the tuning process is therefore not yet concluded. In step 114 the decision algorithm conveys the information to the controlling algorithm 54 that the correction values $dK_I$ is small enough and that the tuning cycle is therefore concluded.

Although not explicitly shown in FIGS. 5 and 6, it is also possibly to monitor oscillations and instabilities of the dependence of the controller output and the controlled variable. In the event of excessively large oscillations during the control phase, the control process is immediately terminated, the controller parameters are reset to their initial values and an error is indicated. This error situation, however, occurs only when the fuzzy controller 8 is used to tune a control system whose structure and design are fundamentally different. A control system of this kind may, however, also be tuned with the method of the invention, if the individual control bases of the fuzzy controller 8 are adapted accordingly for the new system or if a controller type different from the PIV controller 4 is used.

As evident from FIGS. 5 and 6, the tuning process usually converges in less than—under normal conditions much less than—30 tuning passes. A high number of tuning passes indicates that the control attributes of the PIV controller 4 are not yet satisfactory, but that, for example, the driver stages of the control path 6 have almost reached their technical limits and the control system is on the verge of becoming nonlinear. It should be mentioned that—due to the nature of the fuzzy controller 8—correction values $dK_P$, $dK_V$ or $dK_I$ having a value of exactly zero are very unlikely even though the PIV controller 4 is already working satisfactorily. For this reason, the preset threshold values (5% and 9%, respectively) are used for the two decision algorithms 68 and 92 shown in the FIGS. 5 and 6.

If the number of tuning passes for the decision algorithm 68 increases above a preset value (in the example, 30), then the Reject Flag will be set indicating that the tuned controller parameters $K_P$ and $K_V$ are to be rejected. This, however, only occurs under special circumstances, especially when small steps of a step-like control input distribution are applied to the PIV controller 4. Under these circumstances, the fuzzy controller 8 uses, instead of the controller parameters $K_P$ and $K_V$ which were tuned in this manner, those controller parameters which were obtained during tuning with a control input distribution having a large step height. The controller parameters $K_P$ and $K_V$ of the position and velocity controller elements are tuned first. During this tuning process, the controller parameter $K_I$ of the integral controller element is set to a preferably very small, constant value. Then the integral controller element basically does not influence the control behavior; it may, however, induce the driver stage to provide a necessary bias so that the drive 33 is able to support certain loads. The controller parameters $K_P$ and $K_V$ are iteratively altered during the tuning process, until a satisfactory dynamic control behavior are achieved. The stationary behavior is not taken into consideration during this tuning process since it is impacted mainly by the integral controller element. It is necessary to execute different tuning passes having different step-like control input distributions with increasing step heights applied to the PIV controller 4, until the maximum speed or acceleration, as the case may be, of the control path 6 is achieved. It has been found experimentally that it is sufficient to tune the position and velocity controller elements only for two step-like control input distributions. First, a control input distribution with a small step height is selected for finding a stable first solution, instead of applying larger steps to the PIV controller 4 which could lead to instabilities. With the values of the first solution, a second tuning process is executed wherein a step-like control input distribution with a large step height is applied to the PIV controller 4. The step is selected such that the control path 6 reaches, for example, 70% of its maximum speed or acceleration.

The desired solution for the controller parameters $K_P$ and $K_V$ are those controller parameters $K_{P(gr.)}$ and $K_{V(gr.)}$ that were found using the step-like control input distribution having a large step height. Subsequently, these parameters can also be used for smaller step heights. Most often, the controller parameters $K_{P(gr.)}$ and $K_{V(gr.)}$ tuned with large step heights are somewhat smaller than the controller parameters $K_{P(kl.)}$ and $K_{V(kl.)}$ found for small step heights, since $K_{P(gr.)}$ and $K_{V(gr.)}$ are intended to prevent the driver stage in the control path 6 from reaching saturation. However, it may also happen—e.g. in case of a very large dynamic friction—that the controller parameters $K_{P(gr.)}$ and $K_{V(gr.)}$ tuned with large step heights exhibit a larger maximum overshoot value $x_{max}$ than the controller parameters $K_{P(kl.)}$ and $K_{V(kl.)}$ determined earlier for small step heights. For this reason, an eighth comparison step 110 is implemented in the decision algorithm which in this case rejects the controller parameters $K_{P(gr.)}$ and $K_{V(gr.)}$ tuned with large step heights and uses instead the controller parameters $K_{P(kl.)}$ and $K_{V(kl.)}$ found for small step heights. The other situation usually arises, for example, for spindle drives where the static friction dominates. When the controller parameters $K_{P(gr.)}$ and $K_{V(gr.)}$ found with large step heights are used, the response of the entire control system is slightly overdamped and requires somewhat more time before it settles down. This problem is solved by using the tuning step for the controller parameter $K_I$ of the integral controller element, in that the controller parameter $K_I$ is tuned to a rather large value.

Figure 7:
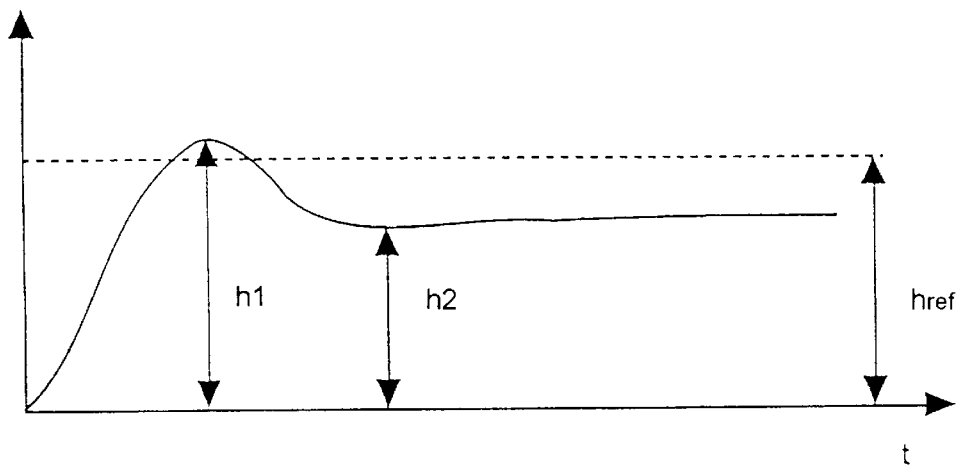
FIG. 7 as an example, is a time dependence of the controlled variable in response to an applied step-like control input distribution.

FIG. 7 shows a possible time dependence of the controlled variable in response to an applied step-like control input distribution. The control input distribution is shown as a broken line with its step height labeled as $h_{ref}$. The time dependence of the position is shown as a solid line. Especially for large step heights, it may happen that the controlled variables—in this case the positional distribution— exhibits a relatively small overshoot $h_1$ but a relatively large undershoot $h_2$. The fuzzy controller 8 has to be able to recognize this situation, too, since the control system is obviously underdamped (e.g. for negligible friction or for a stronger drive 33) although the first (normalized) overshoot value (i.e. $h_1/h_{ref}$) is comparatively small. This situation can be taken into account in that the overshoot value, especially for large step heights, is calculated according to the following formula:

overshoot value=$1+(h_1-h_2)/2$

For small step heights, the overshoot value is calculated as usual:

overshoot value=$h_1/h_{ref}$

The fuzzy controller 8 is designed in such a way that it always searches for a solution for the controller parameters $K_P$, $K_V$ and $K_I$ which results in a small overshoot of the controlled variable above the control input distribution. Hereby, the aperiodic limit with its long settling and control times is avoided. The control input distribution transmitter 18 is capable of providing the PIV controller 4 with the time-sequential control input values having the same clock rate as the clock rate with which these control input values are generated in the CNC 2. This ensures that the control system is optimized to the greatest extent possible with respect to the preceding CNC 2.

Also during the tuning process, the means for increasing the accuracy of the controller output converted by the D/A converter is switched off and the measure for decreasing the controller parameter $K_V$ of the velocity controller element for small position and the speed errors is not activated.

Figure 8:
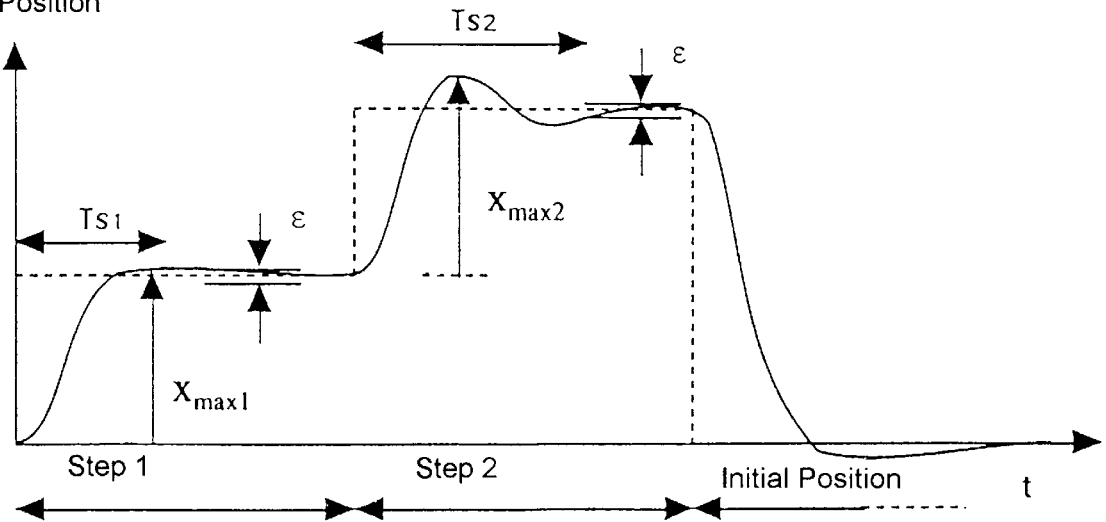
FIG. 8 as an example, is a time dependence of the controlled variable in response to an applied two-step control input distribution for tuning the I controller element.

FIG. 8 shows a two-step control input distribution for tuning the I controller element and, as an example, a corresponding time dependence of the controlled variable. After the controller parameters $K_P$ and $K_V$ have been tuned and supplied to the PIV controller 4, the controller parameter $K_I$ of the integral controller element is tuned. Hereby, the initial value of the controller parameter $K_I$ is that value which was selected for tuning the controller parameters $K_P$ and $K_V$. It is known that the integral controller element of a PIV controller 4 is mainly used for preventing stationary errors caused by static loads (e.g. the Z-axis of an electro-erosion machine) and for compensating for friction. Here, short time constants of the integral controller element are not necessary for preventing stationary errors, since e.g. in electroerosion machines the static load applied to the Z-axis can basically be regarded as constant. The situation where friction has to be compensated, is different. Since friction has to be overcome as quickly as possible, the settling time $T_S$ of the control system (in response to, for example, a step-like control input distribution) has to be kept short.

For this reason, the controller parameter $K_I$ should be tuned to as large a value as possible, while an upper limit has to be set so that the I controller element does not accumulate too much, thereby causing a strong overshoot of the controlled variable over the control input. This problem can be obviated to a large extent by using the anti-oversaturation unit described below.

Experiments have shown that the friction present in spindle drives is mainly static in nature and increases when the spindle drive changes its drive direction due to nonlinear effects in the transmission of mechanical energy (reduction gear, belt drive 34, spindle 36, etc.). As a result, the force required for overcoming friction is smaller when the drive, after an interruption, continues to be driven in the same direction as when the direction is changed. In order to account for these two situations, the two-step control input distribution shown in FIG. 8 is supplied to the PIV controller 4 for tuning the controller parameter $K_I$. Herein, the two step heights are identical and correspond approximately to a small step height, as is provided for tuning the controller parameters $K_P$ and $K_V$. The time dependence of the controlled variable, here the position, is shown as a solid line, indicating for each step period an overshoot value $x_{max1}$ and $x_{max2}$, respectively. In addition, for each step period there are indicated the settling time $T_{S1}$, and $T_{S2}$, respectively, required by the PIV controller 4 to limit the positional error for the control input distribution within a given limit $\epsilon$.

The overshoot values $x_{max1}$ and $x_{max2}$ are normalized to the respective step height according to the procedure shown in FIG. 7. After both steps of the two-step control input distribution have been supplied to the PIV controller 4, the control path 6 is returned to its initial position.

Afterwards, the overshoot value $X_{max2}$ is larger than the overshoot value $x_{max1}$ since the spindle drive is already biased in the subsequent feed direction. If the spindle drive is returned to its initial position, then it will already be biased in the reverse direction, so that the friction which has to be overcome for reaching the first step when the two-step control input distribution is executed again, is larger.

Figure 10:
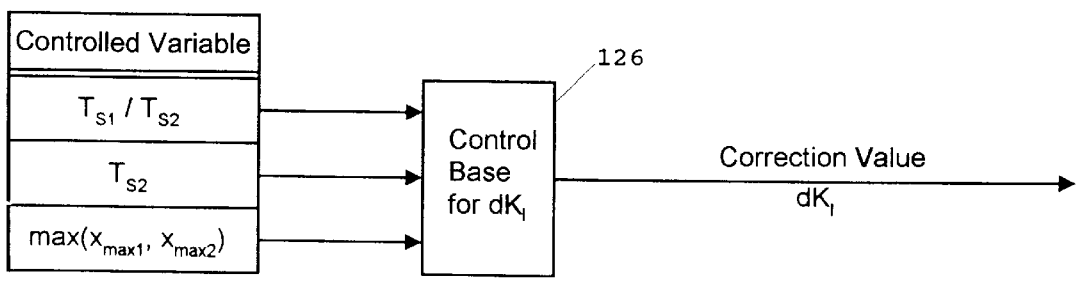
FIG. 10 schematically, is a control base of the fuzzy controller of the invention for tuning the I control element using the corresponding physical quantities derived from the controlled variable.

The following physical quantities may enter a control base 126—which is described with reference to FIG. 10—for tuning the controller parameter $K_I$: an overshoot value corresponding to the greater of the two overshoot values $x_{max1}$ and $x_{max2}$, one of the two times $T_{S1}$ or $T_{S2}$ as well as either the other time $T_{S2}$ or $T_{S1}$, respectively, or a time ratio $T_{S1}/T_{S2}$. This time ratio is a measure for the changes in the response of the control system to the first and the second step of a two-step control input distribution. Therefore, the control base 126 is designed to match the two settling times $T_{S1}$ and $T_{S2}$ and to minimize the two overshoot values $x_{max1}$ and $x_{max2}$ (while keeping them greater than 1).

Figure 9:
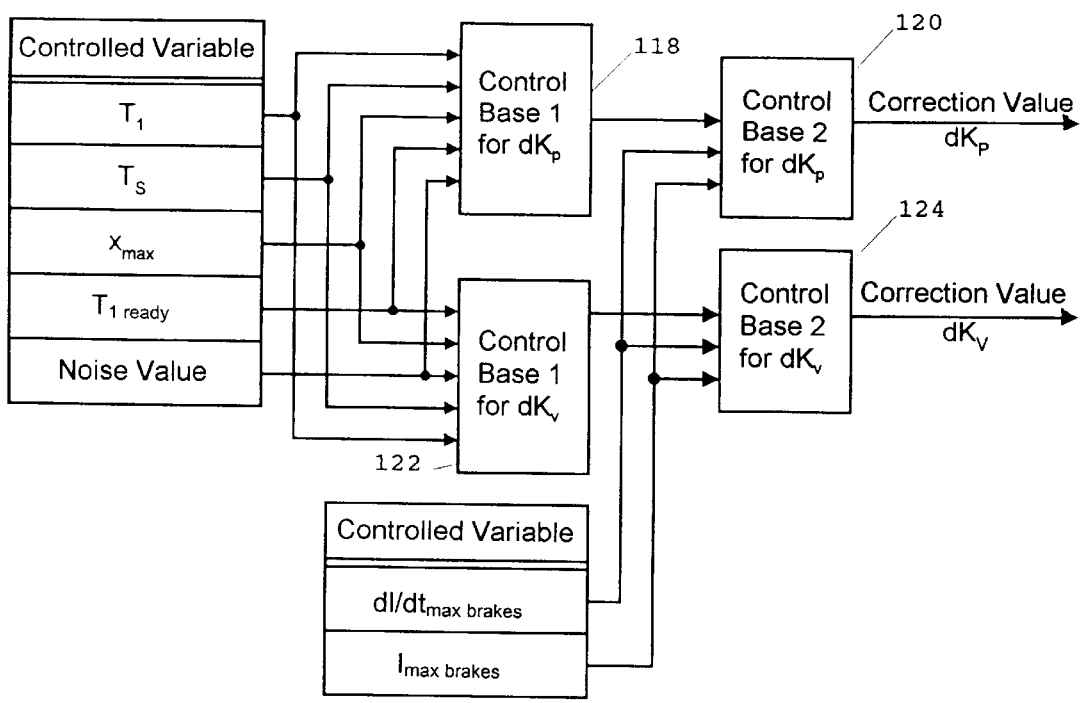
FIG. 9 schematically, is a control bases of the fuzzy controller of the invention for tuning the P and V control elements using the corresponding physical quantities derived from the controlled variable and controller output, respectively.

FIG. 9 shows different control bases of the fuzzy controller 8 of the invention from FIG. 1 with the accordingly assigned physical quantities derived from the controlled variable and the controller output for tuning the P and V controller elements. For this purpose, the first control base 22 shown in FIG. 1 is partitioned into two first control bases 118 and 122 for tuning the controller parameters $K_P$ and $K_V$, respectively. To each of the control bases 118 and 122, there are supplied the quantities $T_1$, $T_S$, $x_{max}$, $T_{1\,ready}$ and the noise value which are all derived from the controlled variable. The first control bases 118 and 122 determine correction values $dK_P$ and $dK_V$ assuming that no technical limits exist for the control path 6 (especially the driver). The correction values $dK_P$ and $dK_V$ supplied by the first control bases 118 and 122 are then corrected by a set of second control bases—a second control base 120 for the correction value $dK_P$ and a second control base 124 for the correction value $dK_V$—so that the technical limits are taken into account and nonlinearities in the control path 6 can be eliminated. For this purpose, the two second control bases 120 and 124 are supplied with the physical quantities $dI/dt_{max\,brakes}$ and $I_{max\,brakes}$ derived from the controller output. The "defuzzified" correction values $dK_P$ and $dK_V$ supplied by the two control bases 120 and 124 are subsequently conveyed to the PIV controller 4 via the controller output link 16.

As mentioned above, the physical quantities $dI/dt_{max\,brakes}$ and $I_{max\,brakes}$ derived from the controller output indicate if saturation of the driver in the control path 6 can occur. The physical quantities derived from the controlled variable—$T_1$, $T_S$, $x_{max}$, $T_{1\,ready}$ and the noise value—describe the response of the control system to the control input distribution applied thereto. FIG. 10 shows schematically a control base 126 of the fuzzy controller 8 for tuning the controller parameter $K_I$ of the integral controller element with the associated physical quantities derived from the controlled variable. The physical quantities supplied by the controlled variable to the control base 126 for calculating the correction value $dK_I$ are $T_{S1}/T_{S2}$, $TS_2$ and the larger of the two overshoot values $x_{max1}$ and $x_{max2}$.

Figure 11:
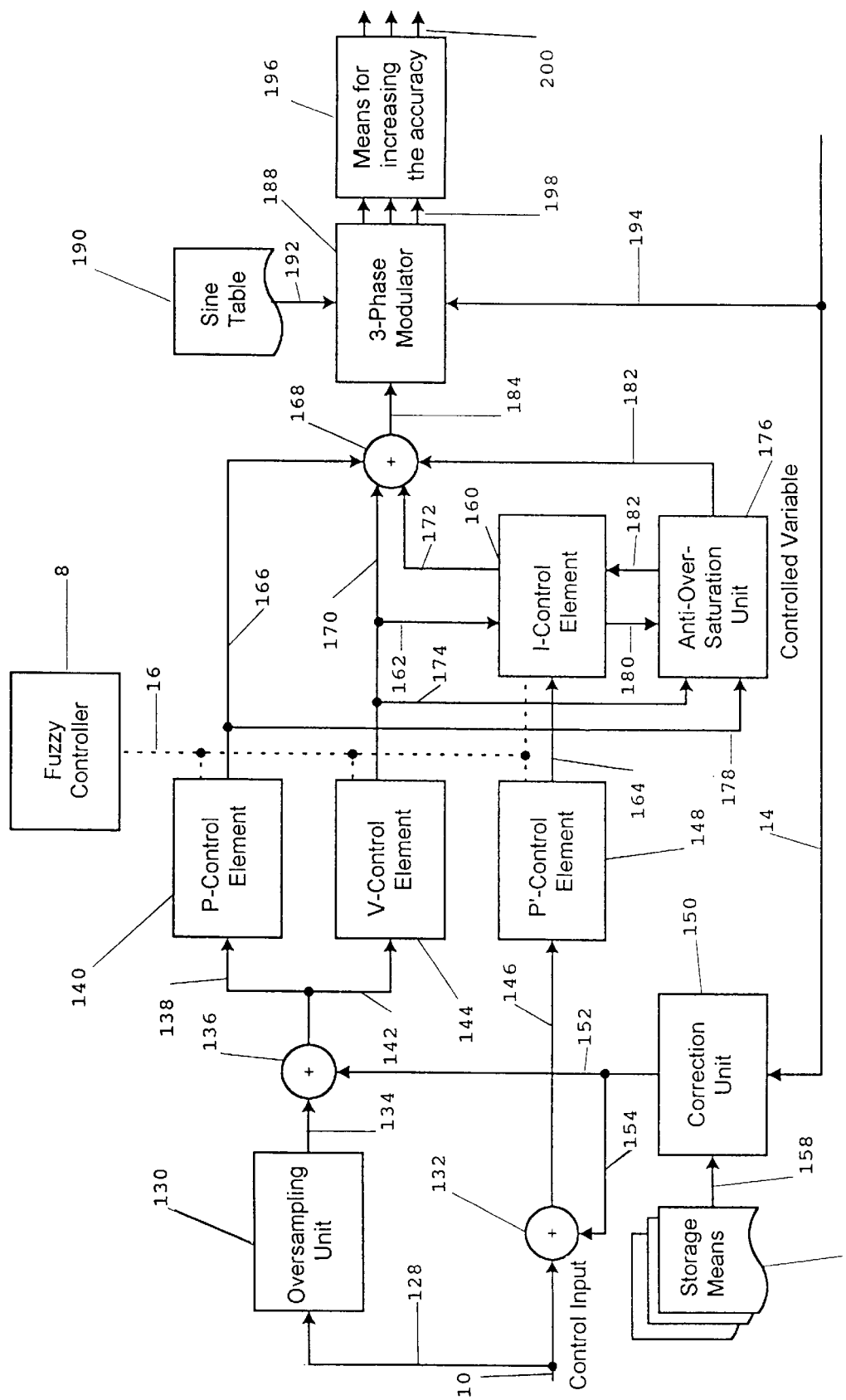
FIG. 11 schematically, is an embodiment of a controller according to the invention.

FIG. 11 shows schematically the design of a preferred embodiment of a controller according to the invention. The control input link 10 originating at the CNC 2 of FIG. 1 is connected to an adder 132 and via a branch 128 to an oversampling unit 130. The oversampling unit 130 is provided for oversampling the control input values received via the control input link 10 and 128. For this purpose, the PIV controller 4 is, for example, clocked with a clock rate which is n times the clock rate of the CNC 2. Within one clock period of the CNC 2, the oversampling unit 130 can then interpolate n-1 values in one clock period of the PIV controller 4 and can consequently increase the internal computational accuracy of the PIV controller 4.

For example, the CNC 2 can instruct the PIV controller 4 using two control input values which are spaced apart by one clock period of the CNC 2, to drive the control path 6 from the position $x_1$ to position $x_2$. This corresponds to a velocity $v=(x_2-x_1)/T_{CNC}$, where $T_{CNC}$ is the clock period of the CNC 2. The oversampling unit 130 divides the required positional change $x_2-x_1$ into n smaller positional changes $(x_2-x_1)/n$, each of these changes to be executed by the PIV controller 4—using its clock period $T_{PIV}$—n times within a clock period $T_{CNC}$ of the CNC 2 to provide the velocity v. The oversampling unit 130 then conveys these finely resolved position steps $(x_2-x_1)/n$ to the individual controller elements of the PIV controller 4. For this purpose, the oversampling unit 130 is connected via a link 134 to an adder 136 which in turn is connected via a link 138 to a position control element 140 and via a link 142 to a velocity control element 144. The PIV controller 4 further comprises an additional position control element 148 which is connected via the adder 132 by way of a link 146 directly to the control input link 10. The position control element 148 thus receives the control input values with the clock rate of the CNC 2. Consequently, the set position $(x_1+(x_2-x_1)*i/n)$ is reduced by a factor of n (assuming that the driver stage in the control path 6 is not saturated). The response time of the control system is now increased due to the oversampling unit 130 and the error caused by adjusting the control path in a multi-axis system is reduced.

The controlled variable $x_{measured,\,i}$ received via the controlled variable link 14 is transmitted to a correction unit 150 which corrects the controlled variables $x_{measured,\,i}$ as required and conveys the corrected values via a link 152 to the adder 136 and via a link 154 to the adder 132. The two adders 132 and 136 in FIG. 11 are only shown as a reminder since the difference between control input and controlled variable is formed inside the individual controller elements 140, 144 and 148.

The correction unit 150 is provided to correct mechanical inaccuracies of the control path 6. Mechanical inaccuracies may, for example, be caused by the drive bearing, the belt drive 34, the spindle 36, etc. Then the linear position of the unit driven by the spindle drive does not exactly correspond to the same position which can, for example, be derived from the measured position of the drive 33. The largest error is caused by the so-called alignment error of the spindle, i.e. the spindle is not aligned exactly parallel to the coordinate axis. This leads to alignment errors especially in multi-axis systems where, for example, a spindle which is inaccurately aligned in the x-direction, may influence the position of a unit guided in the y-direction. Other sources for error may stem from the individual drive bearings. In order to correct these linearity and alignment errors, the position of the unit guided by the spindle drive is measured, for example, by a laser tool and corresponding correction values are stored in a suitable storage medium 156. The storage medium 156 is connected via a link 158 with the correction unit 150 in such a way that the correction unit is able to access the data of the storage medium 156 and to correct the values of the controlled variables accordingly. In this manner, a positional accuracy in the order of micrometers can be achieved.

In FIG. 11, the PIV controller 4 comprises an integral controller element 160 having its input connected via a link 162 to the output of the velocity controller element 144 and via a link 164 to the output of the position controller element 148. The integral controller element 160 may compute its output value, for example, according to the following formula:

$$I_{output,\ i}=I_{output,\ i-1}+K_I{}^*(P_{output,\ i}+V_{output,\ i}),$$

where $I_{output,\ i}$ are the output values of the integral controller element 160 outputted with the clock rate of the PIV controller 4, $K_I$ is the controller parameter of the integral controller element 160, $P_{output,\ i}$ is the output value of the position controller element 148 outputted with the clock rate of the CNC 2, and $V_{output,\ i}$ is the output value of the velocity controller element 144 obtained with the clock rate of the PIV controller 4.

The integral controller element 160 is thus supplied with the output values of the position controller element 148 and the velocity controller element 144. As seen from the above computation, the errors in the position and velocity enter the output value $I_{ouput,\ i}$ of the integral controller element with the same relative weight as they enter the output values $P_{output,\ i}$ and $V_{output,\ i}$ of the position controller element 148 and the velocity controller element 144, respectively. Here, the integration of the velocity error helps to overcome the static friction when the drive 33 is started from its rest position. The large velocity error which occurs immediately during the initial step of a step-like control input distribution (the required velocity is theoretically infinite, the actual velocity, however, is zero) contributes significantly to the accumulation in the integral controller element 160. Here, the integral controller element 160 shortens the time required to overcome the friction by providing relatively quickly a large output value $I_{output,\ i}$ to the control path 6. The error in the position shifts by a constant value as a result of the integration of the velocity error. This constant value is subsequently used to "bias" the control path 6 with a torque compensating the friction.

The integration of the position error by accumulating the output value $P_{output,\ i}$ of the position controller element 148 reduces basically the influence due to static friction. The integral controller element 160 accumulates the difference of the actual position $x_{measured,\ i}$ measured with the clock rate of the PIV controller 4 and the nominal position $x_1$ or $x_2$, respectively, supplied with the clock rate of the CNC 2, i.e. the nominal position supplied to the integral controller element is not oversampled in the nominal positions $x_1+(x_2-x_1)*i/n$. By this measure, the position error is artificially enhanced which has the advantage that during movements with constant speed the unit driven by the spindle drive is "lagging" less behind its nominal position $x_1+(x_2-x_1)*i/n$. The output of the position controller element 140 is connected via a link 166 to a first input of an adder 168, the output of the velocity controller element 144 is connected via a link 170 to a second input of the adder 168, and the output of the integral controller element 160 is connected via a link 172 to a third input of the adder 168. The adder 168 adds the output values of each of the controller elements 140, 144 and 160 to a total output value.

The PIV controller 4 further comprises an anti-oversaturation unit 176 associated with the integral controller element 160. Herein, the input of the anti-oversaturation unit 176 is connected via a link 174 to the output of the velocity controller element 144, via a link 178 to the output of the position controller element 140, and via a link 180 to the output of the integral controller element 160. Via these links 174, 178 and 180, the anti-oversaturation unit 176 receives the output values $P_{ouput,\ i}$, $V_{output,\ i}$ and $I_{output,\ i}$ of the individual controller elements 140, 148 and 160 and adds these values to a total value.

The anti-oversaturation unit 176 subsequently compares the total value with a preset maximum value. If the total value exceeds the maximum value, then the last accumulation of the integral controller element 160 is reversed. For this purpose, the output of the anti-oversaturation unit 176 is connected via a link 182 to an input of the integral controller element 160. In addition, the anti-oversaturation unit 176 subtracts in this case the last output value $I_{output,\ i}$ of the integral controller element 160 from the total output value of the adder 168. For this purpose, the output of the anti-oversaturation unit 176 is connected via a link 184 to another input of the adder 168. If the total value after the output value $I_{ouput,i}$ of the integral controller element 160 has been subtracted, is still larger than the maximum value, then the anti-oversaturation unit 176 can request from the adder 168 via the link 184 to set the total output value equal to the maximum value.

The anti-oversaturation unit 176 thereby prevents an excessive accumulation of the integral controller element 160 which would otherwise provide an excessively large contribution to the control. Such a large accumulation occurs in particular when step-like control input distributions with large step heights are supplied to the PIV controller 4 which can drive the driver stage in the control path 6 into saturation. Consequently, the entire control system will again exhibit a nonlinear behavior leading to undesirable instabilities or at least to an undesirable strong overshoot of the controlled variable over the control input. The anti-oversaturation unit 176 prevents this from occurring.

The anti-oversaturation unit 176 also supports the fuzzy controller 8 during tuning of the controller parameter $K_I$ of the integral controller element 160, since it now can permit a larger value for the controller parameter $K_1$ without running the risk that the driver stage will be overloaded (potential instantaneous overloads caused by a too large controller parameter $K_I$ are quickly cut off by the anti-oversaturation unit 176). This measure permits an even more effective compensation of the static friction.

In the controller of FIG. 11, there is (optionally) further provided an additional 3-phase modulator 188 having a sine table 190 connected to its input via a link 192, for fast controller-internal computation of three phases. This is only required when a 3-phase motor (e.g. a brushless electric motor) is used and serves to appropriately separate the (scalar) controller output from the adder 168 into the three phase components. The sine table 190 comprises, for example, values of the sine function required for calculating the 3 phases. The 3-phase modulator 188 is further connected via a link 194 to the controlled variable link 14 (see also FIG. 1) for determining the three phases and in turn receives via the link 14, 194 the actual measured position $x_{measured,\ i}$ as a basis for its phase computations.

Generally, not all drives in machine tools are constructed in an identical manner. Especially in electroerosion machines, there are commonly principal axes (e.g. X, Y) and auxiliary axes (e.g. U, V) which support different loads. For various reasons (cost, handling, economy, etc.) it would be desirable to use identical driver stages for controlling all of the aforementioned drives. In particular, the output variables of such driver stages should be adaptable to the respective drive, i.e. they should have a large dynamic bandwidth. The current to be supplied by a driver stage is commonly derived from a digital input value supplied to the driver stage. This digital input value first has to be transformed into an analog current value which is usually done by a D/A converter. The reference voltage of the D/A converter in a driver stage having the large dynamic bandwidth mentioned above should be programmable. This makes it possible to supply the various different current ranges required by each of the drives 33 by taking advantage of the entire range of digital values provided by the PIV controller 4. A change of one bit in the digital output value of the PIV controller 4 then always corresponds to the smallest possible change in current of the driver stage for the respective drive. Programming the reference voltage also reduces, among others, the so-called positional noise (when the drive 33 is at rest), since the change in current induced in each drive 33 by a change of one bit in the digital input value is now minuscule. The undesirable positional noise can also be reduced by increasing the resolution of the D/A converter, i.e. by increasing the number of bits (usually 8 bits are used). Each of the three phases from the output of the 3-phase modulator is then supplied via respective links 198 to a means 196 for increasing the accuracy. Each means 196 for increasing the accuracy is in turn connected to one D/A converter (not shown) via a link 200. The functionality of these means 196 for increasing the accuracy will be discussed hereinafter in more detail with reference to FIG. 12.

Also shown in FIG. 11 is the fuzzy controller 8 for tuning the controller parameters $K_P$, $K_V$ and $K_I$ of the individual controller elements 140, 144, 148 and 160. The tuned controller parameters $K_P$, $K_V$ and $K_I$ or their correction values $dK_P$, $dK_V$ and $dK_I$, as the case may be, are transmitted by the fuzzy controller via the fuzzy controller output link 16 to the individual controller elements 140, 144, 148 and 160. Herein, the fuzzy controller is only switched on when requested by a user and/or by the CNC 2, whereafter it performs exactly one tuning process and finally switches itself off again at the end, so that the PIV controller 4 can function again in its normal state. Preferably, the fuzzy controller can tune the controller parameters $K_P$, $K_V$ and $K_I$ only when the PIV controller 4 does not concurrently have to fulfill "control requests" requested by the CNC 2. The tuned parameters are then stored in a non-volatile memory and cannot be changed during normal operation of the PIV controller 4. It is, on the other hand, also possible to tune the controller parameters concurrently if the "control requests" requested by the CNC 2 have the lowest priority, in which case the control input distribution transmitter 18 transmits only those control input distributions to the PIV controller which lie within preset tolerance limits of a "control request" with the lowest priority. It has to be specifically pointed out that the PIV controller 4 shown in FIG. 12 can be advantageously employed even without the fuzzy controller 8, if in particular the oversampling unit 130, the correction unit 150, the anti-oversaturation unit 176, the means 196 for increasing the accuracy and the other measures mentioned above for improving the control attributes of the PIV controller 4 can be used—with or without the fuzzy controller 8—with the PIV controller 4 either severally or in combination.

Figure 12:
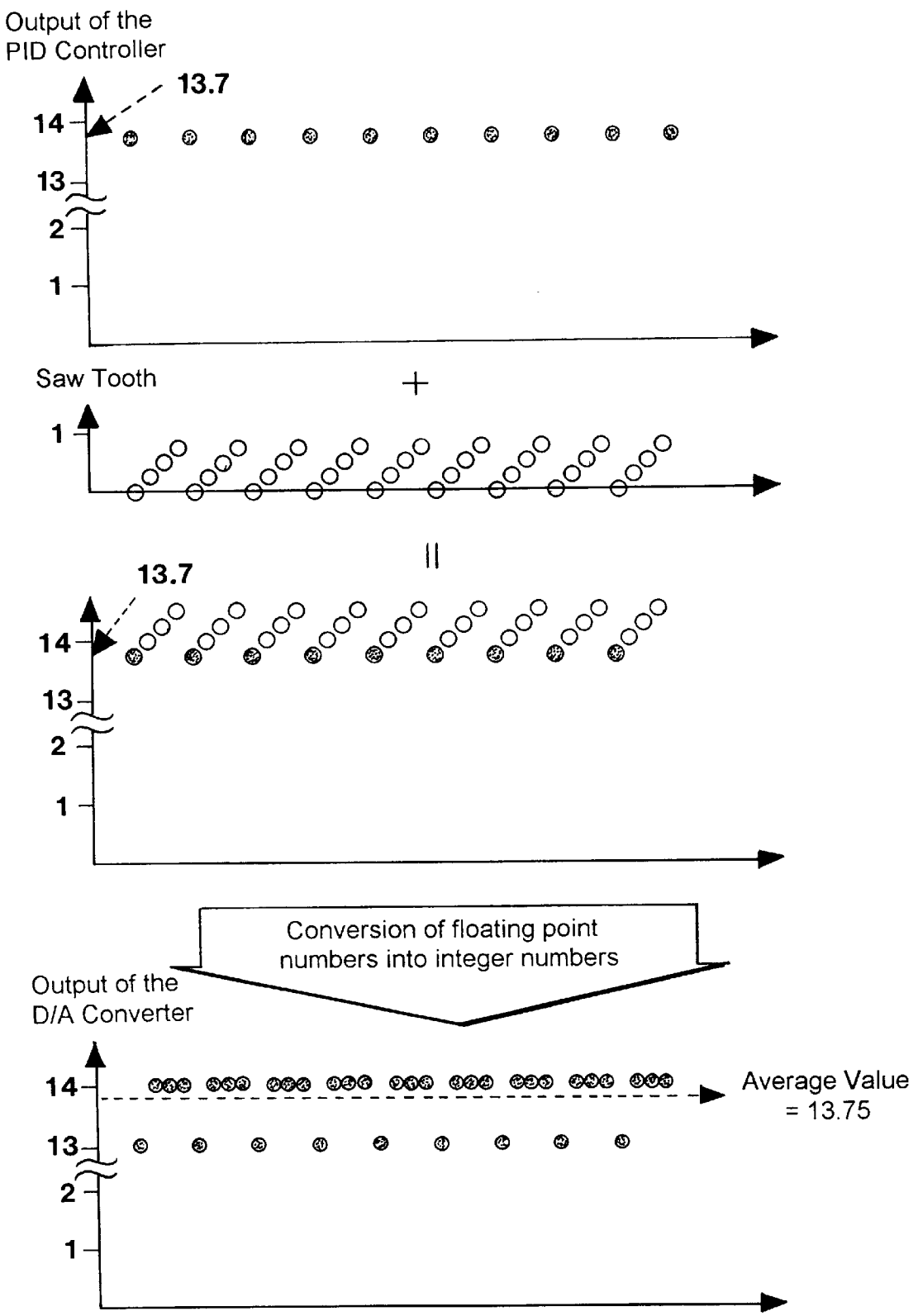
FIG. 12 are various diagrams with consecutive controlled variables of the PIV controller, for illustrating the increasing accuracy of the signal supplied to the D/A converter.

FIG. 12 shows various diagrams with consecutive output values of the PIV controller 4 and of the means 196 for increasing the accuracy. The upper diagram, for example, shows output values supplied by the PIV controller 4 at its clock rate and the phase values derived by the 3-phase modulator 188, respectively. These output and phase values, respectively, are usually calculated as floating point numbers with a certain number of digits after the decimal point. The floating point numbers would have to be converted to integer numbers before they are inputted to the D/A converter, i.e. their digits after the decimal point would have to be truncated or rounded. The D/A converter would, for example, work with the value 14 instead of 13.7 and convert this value into an analog value.

The means 196 for increasing the accuracy now generate in a first step a sequence of numbers between 0 and 1 with a sampling rate which is higher than the sampling rate of the PIV controller 4, as shown in the second diagram of FIG. 12. This number sequence is—in a second step—(third diagram in FIG. 12) added to an output value of the PIV controller 4. This generates a kind of saw tooth pattern in FIG. 12, wherein the minimum value corresponds to the output value of the PIV controller (shown in the third diagram as a filled dot) and wherein the values at the edge correspond to the values of the number sequence outputted with the higher sampling rate and added to the one output value. The height difference of the edge thereby corresponds to exactly one bit of the D/A converter. In a third step, the individual values of the saw tooth pattern which are still represented in floating point notation, are converted into integer numbers. In most cases, the digits after the decimal point are simply truncated. The result of the truncation is shown in the fourth diagram of FIG. 12. The time-average value of these digital input values, e.g. between 0 and 255, supplied to the D/A converter—which are more numerous than the output values from the PIV controller 4 because of the increased sampling rate—now corresponds approximately to the output value provided by the PIV controller 4 in floating point representation. The driver stage and the attached drive 33 form a kind of low pass for performing this time-averaging function.

The time-averaged resolution thus increases with increasing sampling rate used to form the number sequence (shown in the second diagram). In the example shown in FIG. 12, the time-averaged resolution has increased by 2 bits, i.e. by a factor of 4. Preferably, the sampling rate of the number sequence should be a multiple of the sampling rate of the PIV controller 4. The sampling rate has an upper limit where the cut-off frequency of the driver and the drive which function as low-pass filters, is reached and the averaging process is therefore no longer carried out.It should be mentioned that the number sequence does not necessarily have to contain numbers located on the edges of a saw tooth profile. Any other number sequence with statistically uniformly distributed numbers may also be used. In order to provide a better understanding, the output value of the PIV controller 4 in FIG. 12 is shown as being constant over several clock cycles. If this value is not constant, then the means 196 for increasing the accuracy may generate small errors which, however, are always smaller than 1 bit. This situation, however, does not usually occur since the positional noise is troublesome only when the motor has stopped, i.e. the output value of the PIV controller 4 remains constant.

A further measure for reducing the positional noise is to reduce the controller parameter $K_V$ of the velocity controller element 144 (for example, to a third of its previous value) if both the positional and the velocity errors (deviation between nominal and actual value) are smaller or equal to a minimum value corresponding to the smallest value that can be resolved by the D/A converter or the like, e.g. a change of 1 bit. Positional noise is mainly the result of these one bit changes. Although the PIV controller 4 provides as a result of its floating point calculations an output value that is smaller than the equivalent of one bit, the D/A converter, because of its internal resolution limit (only integer number processing), can generate only an output value (current) which is equivalent to one bit.

One bit changes of this type can, for example, be caused by the optical sensor system 38. If the drive 33 is stopped and the sensor system 38 indicates a change in position in the order of one bit, then the drive 33 will be controllably returned to the stop position basically by the velocity controller element 144, since the velocity error corresponding to one bit is larger that the equivalent positional error. The instantaneous velocity error is, of course, the change in position equivalent to on bit with the clock period of the PIV controller 4. The larger the controller parameter $K_V$ of the velocity controller element 144, the larger is also the positional noise in the stop position since the reaction to these errors is more severe. The positional noise is now advantageously reduced by reducing the controller parameter $K_V$ at the time when the drive 33 has stopped, without measurably changing the dynamic control attributes of the PIV controller 4.

A further measure for reducing the positional noise is to filter the velocity signal derived from the controlled variable. For this purpose, however, the controller parameter $K_V$ of the velocity controller element 144 first has to be increased accordingly in order to achieve the same response time to a positional change in the control input distribution. Consequently, a compromise will have to be found between an excessively large increase in controller parameter $K_V$ and filtering of the velocity signal. Furthermore, it has to be taken into account that the positional changes of one bit usually occur at low frequencies and consequently are filtered to a lesser degree by the control path 6.

A further measure for reducing the positional noise is to improve the resolution of the sensor system 38 itself.

During the internal conversion of the floating point numbers into integer numbers is has to be taken into account that each integer number is associated with an interval of identical size having floating point numbers. Especially in common programming languages, mapping of the integer number "zero" is irregular, since the entire interval of floating point numbers between −1 and +1—i.e. an interval with a length of 2—is mapped onto the integer number "0" whereas each of the other intervals mapped to one integer number has only the length of 1 (the interval with floating point numbers between +1 and +2 is mapped to the integer number +1, etc.). As a result, the accuracy in the interval −1 to +1 which describes the region where the drive is stopped, is reduced by 50%. A loss of accuracy in this region therefore results in an undesirable positional noise. For example, if the drive changes its correct position and the PIV controller 4 reacts thereto by changing its output values supplied in floating point notation from, e.g., −0.6 to 0.7, then there will be no change in the converted integer number to be inputted into the D/A converter. Whereas the floating point value changes internally by a value greater than 1, this change is disregarded in the subsequent conversion.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. Method for tuning at least one controller parameter ($K_P$, $K_V$, $K_I$) of a PIV controller (4) by tuning at least one of a position controller element (140; 148), a velocity controller element (144) and an integral controller element (160) for a control path (6) of a drive (33) in an electroerosion apparatus, utilizing a fuzzy controller (8), comprising the steps of:

(a) providing for tuning, a preset control input time-dependent distribution of the position of the drive (33) to the PIV controller (4) as an input variable;

(b) deriving at least one first input variable of the fuzzy controller (8) from a control variable of the PIV controller (4) based on an output of the control path (6); and (c) deriving at least one second input variable of the fuzzy controller (8) from a controller output of the PIV controller (4).

2. The method according to claim 1, wherein the tuning of the velocity control element (144) and the position control element (140; 148) is accomplished first followed by tuning the integral control element (160) of the PIV controller (4).

3. The method according to claim 2, wherein the position controller element (140; 148) and the velocity controller element (160) are a) first tuned with a first control base (22) without considering technical limitations of the control path (6); and b) subsequently tuned with a second control base (26) taking into consideration the technical limitations of the control path (6).

4. The method according to claim 3, further comprising the steps of:

deriving physical quantities $x_{max}$, $T_1$, $T_S$, $T_{1\ ready}$, $I_{max\ brakes}$, $dI/dt_{max}$, $T_{S1}$, $T_{S2}$, $x_{max1}$, $x_{max2}$ from one of the controller variables and the controller output of the PIV controller (4); and utilizing the physical quantities as input values to the fuzzy controller (8).

5. The method according to claim 4, further comprising the steps of deriving as input values of the fuzzy controller (8), for tuning the controller parameters ($K_P$, $K_V$) of the position controller element (140; 148) and velocity controller element (144), from the control variables of the PIV controller (4) until a) a first time ($T_1$) the controlled variable reaches a first peak value ($x_{max}$; $h_1$);

b) a first overshoot value which is correlated with the value of one of the first peak value ($x_{max}$; $h_1$) and at least one subsequent peak value ($h_2$) of the controlled variable;

c) a second time ($T_S$) the controlled variable remains between preset limit values linked to the control input distribution ($\epsilon$); and d) a logical value indicative of whether the controlled variable had overshot the control input; and from the controller output of the PIV controller (4):

e) a noise value of the PIV controller output; and f) one of a maximum change over time ($dI/dt_{max\ brakes}$) of the PIV controller output, and a peak value ($I_{max\ brakes}$) of the PIV controller output.

6. The method according to claim 5, wherein different control input distributions are used during consecutive tuning passes until for an optimum control input distribution one of the technical limits of the control path (6) are exceeded and the control behavior corresponds to the desired specifications.

7. The method according to claim 6, wherein two input distributions having steps are selected for the tuning process, one of said input distributions having a first step height and the other input distribution having a second step height, the first step height satisfies criteria for an optimum control input distribution to a greater degree than the second step height.

8. The method according to claim 7, wherein the controller parameters (KP, KV) are tuned such that the peak value (Imax brakes) and the maximum time dependence ($dI/dt_{maxbrakes}$) of the PIV controller output do not exceed their preset maximum value, that the logical value indicates an overshoot of the controlled variable above the control input and/or that the first time (T1) until the controlled variable reaches its peak value, the first overshoot value, the second time (TS) until the controlled variable remains within given limits (ÿ) and the noise value are minimized.

9. The method according to claim 8, wherein the overshoot value is deduced from the first maximum (h1) and the first minimum (h2) of the control input, according to the following formula: overshoot value=1+(normalized height of the first maximum ($h_1$)−normalized height of the first minimum ($h_2$))/2.

10. Method for tuning at least one controller parameter ($K_P$, $K_V$, $K_I$) of a PIV controller (4) by tuning at least one of a position controller element (140; 148), a velocity controller element (144) and an integral controller element (160) for a control path (6) of a drive (33) in an electroerosion apparatus, utilizing a fuzzy controller (8), comprising the steps of:
   (a) providing for tuning, a preset control input time-dependent distribution of the position of the drive (33) to the PIV controller (4) as an input variable;
   (b) deriving at least one first input variable of the fuzzy controller (8) from a control variable of the PIV controller (4) based on an output of the control path (6); and
   (c) deriving at least a second input variable of the fuzzy controller (8) from a controller output of the PIV controller (4);
   wherein the tuning of the velocity controller element (144) and the position controller element (140; 148) is accomplished first, followed by tuning the integral controller element (160) of the PIV controller (4); and
   selecting for tuning the controller parameters ($K_I$) of the integral controller element (160) a two-step control input distribution.

11. The method according to claim 10, wherein there are derived as input values of the fuzzy controller (8) for tuning the controller parameters ($K_I$) of the integral controller element (160) from the controlled variable of the PIV controller (4):
   a) a third time ($T_{S1}$) until the controlled variable remains between preset limits (ε) linked to the first step of the control input distribution;
   b) a fourth time ($T_{S2}$) until the controlled variable remains between preset limits (ε) linked to the second step of the control input distribution;
   c) a second overshoot value correlated with the first peak value ($x_{max1}$) and/or subsequent peak values of the controlled variable during the first step of the control input distribution; and
   d) a third overshoot value correlated with at least one of the first peak value ($x_{max2}$) and subsequent peak values of the controlled variable during the second step of the control input distribution.

12. The method according to claim 11, wherein the controller parameter (KI) of the integral controller element (160) is tuned so that at least one of the third time ($T_{S1}$) and the fourth time ($T_{S2}$) become approximately of equal duration and, the second ($x_{max1}$) and the third ($X_{max2}$) overshoot value are minimized.

13. The method according to claim 12, wherein the tuning process of the respective controller parameters ($K_P$, $K_V$ and $K_I$) is concluded in the event of one of the changes in the controller parameters ($K_P$, $K_V$ and $K_I$) in consecutive control steps of the fuzzy controller (8) lie within preset limits and the number of control steps exceeds a certain number.

14. The method according to claim 13, wherein the controller parameters ($K_P$, $K_V$ and $K_I$) to be tuned are set to values at the beginning of the tuning process in such a way that the control path (6) can react to certain external conditions, and that the drive (33) in the control path (6) is capable of compensating the forces which it is subjected to.

15. The method according to claim 14, wherein the controller parameters ($K_P$, $K_V$ and $K_I$) are reset if the measured controlled variable exhibits excessive oscillations.

16. The method according to claim 15, wherein the control loop of the PIV controller (4) is not opened during the tuning process.

17. The method according to claim 16, wherein the position of a drive (33) included in the control path (6) and the position of the mechanical unit (34, 36) is supplied to the PIV controller (4).

18. A fuzzy controller for tuning at least one controller parameter ($K_P$, $K_V$, $K_I$) of a PIV controller (4) with at least one proportional or position (140; 148), differential or velocity (144) and integral (160) controller element for a control path (6) of a drive (33) in an electroerosion apparatus, comprising:
   a) a control input distribution transmitter (18) coupled to an input of the PIV controller (4) for providing a time-dependent positional distribution of the drive (33), as an input value to the PIV controller (4);
   b) first deriving means (24) coupled to the output of the control path (6) for deriving quantities from the controlled variable of the PIV controller (4); and
   c) second deriving means (28) coupled to the output of the PIV controller (4) for deriving quantities from the controller output of the PIV controller (4).

19. The fuzzy controller according to claim 18, further comprising a first controller parameter ($K_P$, $K_V$) for tuning one of the velocity (144) and position (140; 148) controller elements; and a second controller parameter ($K_I$) of the integral controller element (160) of the PIV controller (4).

20. The fuzzy controller according to claim 18, further comprising, for a drive (33) included in the control path (6), means (38) for acquiring the position of the drive (33) and means for acquiring the position of a mechanical unit driven by the drive (33) and for providing the controlled variable.

21. A controller having at least one of a proportional or position (140; 148), differential or velocity (144) and integral (160) controller element for a control path (6) of a drive (33) in an electroerosion apparatus, and a fuzzy controller (8) for tuning at least one controller parameter ($K_P$, $K_V$, $K_I$) of a PIV controller (4) with at least one proportional or position (140; 148), differential or velocity (144) and integral (160) controller element for the control path (6) of the drive (33) in an electroerosion apparatus, comprising:

a) a control input distribution transmitter (18) coupled to an input of the PIV controller (4) for providing a time-dependent positional distribution of the drive (33), as input value to the PIV controller (4);

b) first deriving means (24) coupled to the output of the control path (6) for deriving quantities from the controlled variable of the PIV controller (4); and c) second deriving means (28) coupled to the output of the PIV controller (4) for deriving quantities from the controller output of the PIV controller (4).

22. The controller according to claim 21, further comprising an oversampling unit (130) for obtaining an n-fold oversampling of the control input supplied to the PIV controller (4).

23. The controller according to claim 22, wherein at least one of the position (148) and velocity (144) controller element and, if necessary, additional position (140) and velocity controller elements are connected in series with the integral controller element (160) in such a way that the accumulation of the integral controller element (160) is based on the output values of the velocity controller element (144) and the position controller element (140, 148).

24. The controller according to claim 22, wherein the oversampling unit (130) is connected in series to a selection of velocity and position controller elements (140, 144).

25. The controller according to claim 21, further comprising an anti-oversaturation unit (176) for the integral controller element (160) to prevent overdriving of the control path (6).

26. The controller according to claim 25, wherein the anti-oversaturation unit (176) compares the absolute value of the controller output of the PIV controller (4) to a preset maximum value for the control path (6) and subtracts, if said value is exceeded, the contribution from the integral controller element (160) from the controller output and reverses the last accumulation of the integral controller element (160).

27. The controller according to claim 26, further comprising a correction unit (150) for correcting at least one of the controlled variable and the control input supplied to the input of the PIV controller (4).

28. A controller having at least one of a position controller element (140; 148), a velocity controller element (144) and an integral controller element (160) providing a controller parameter for a control path (6) in an electroerosion apparatus, and a fuzzy controller (8) for tuning at least one controller parameter ($K_P$, $K_V$, $K_I$) of a PIV controller (4) with at least one of the position controller element (140; 148), velocity controller element (144) and integral controller element (160) for the control path (6), comprising:

a) a control input distribution transmitter (18) coupled to an input of the PIV controller (4) for providing a time-dependent positional distribution of the drive (33) as input value to the PIV controller (4);

b) first means coupled to the output of the control path (6) for deriving (24) quantities from the controlled variable of the PIV controller (4);

c) second deriving means (28) coupled to the output of the PIV controller (4) for deriving quantities from the controller output of the PIV controller (4);

d) an anti-oversaturation unit (176) for the integral controller element (160) to prevent overdriving of the control path (6);

wherein the anti-oversaturation unit (176) compares an absolute value of the controller output of the PIV controller (4) to a preset maximum value for the control path (6) and subtracts, if said preset maximum value is exceeded the contribution from the integral controller element (160) from the controller output of the PIV controller and reverse the last accumulation of the integral controller element (160);

e) a correction means (150) for correcting one of the controlled variable and control input supplied to the input of the PIV controller (4); and f) the correction means (150) comprises a storage means (156) for storing correction values under consideration of the mechanical inaccuracies of the control path (6).

29. The controller according to claim 28, further comprising a digital to analog converter connected to the output of the PIV controller (4) for converting the controller output; and accuracy increasing means (196) for increasing the accuracy of the output of the digital to analog converter.

30. The controller according to claim 29, wherein the accuracy increasing means (196) adds a sequence of values with a higher rate than the sampling rate to the sequence of sampled values of the controller output and convey the sequence to the connected digital to analog converter, wherein the accuracy increasing means (196) select the sequence of values so that the output result of the digital to analog converter approximates the sequence of sampled values of the controller output of the PIV controller when averaged over time.

31. The controller according to claim 30, wherein the accuracy increasing means (196) decreases the controller parameter ($K_V$) of the velocity controller element (144) for a time period in which the controlled variable is substantially constant.

32. A method for controlling a drive path (6) in an electroerosion apparatus, with a PIV controller (4) by tuning at least one controller parameter ($K_P$, $K_V$, $K_I$) of a PIV controller (4) by tuning at least one of a position controller element (140; 148), velocity controller element (144) and integral controller element (160) for a control path (6) utilizing a fuzzy controller (8), comprising the steps of:

(a) providing for tuning, a preset control input time-dependent distribution of the position of the drive (33) to the PIV controller (4) as an input variable;

(b) deriving at least one first input variable of the fuzzy controller (8) from a control variable of the PIV controller (4) based on an output of the control path (6); and (c) deriving at least one second input variable of the fuzzy controller (8) from a controller output of the PIV controller (4).

33. The method according to claim 32, wherein the control input supplied to the PIV controller (4) is n-fold oversampled.

34. The method according to claim 33, wherein the output value of the position controller element (148) and the velocity controller element (144) and, if necessary, an additional position controller element (140) and a velocity controller element is supplied to the integral controller element (160) and taken into consideration during the integration.

35. A method for controlling a drive path (33, 6) in an electroerosion apparatus, with a PIV controller (4) including at least one of a position controller element (140; 148), a velocity controller element (144) and a integral controller element (160), comprising the steps of:

tuning at least one controller parameter ($K_P$, $K_V$, $K_I$) (by tuning at least one of a controller parameter ($K_P$, $K_V$, $K_I$) of a PIV controller (4) with at least one of the position controller element (140; 148), the velocity controller element (144) and the integral controller element (160) for a control path (6, 33) in an electro-erosion apparatus, by utilizing a fuzzy controller (8), comprising the steps of:

(a) providing for tuning, a preset control input time-dependent distribution of the position of the drive (33) to the PIV controller (4) as an input variable;

(b) deriving at least one first input variable of the fuzzy controller (8) from a control variable of the PIV controller (4) based on an output of the control path (6); and (c) deriving at least one second input variable of the fuzzy controller (8) from a controller output of the PIV controller (4);

wherein the control input supplied to the PIV controller (4) is n-fold oversampled; and wherein the output value of the position controller element (148) and the velocity controller element (144) are supplied to the integral controller element (160) and taken into consideration during the integration; and wherein the n-fold oversampled control input is supplied to only a selected controller element (140, 144) and the not oversampled control input is supplied to additional position (148) and velocity controller elements.

36. The method according to claim 35, further comprising monitoring the controller output to prevent overdriving of the control path (6).

37. The method according to claim 36, further comprising the step of comparing the value of the controller output of the PIV controller (4) to a preset peak value ($I_{max}$, $dI/dt_{max}$) for the control path (6) and, if exceeding, subtracting the contribution ($I_{output, I}$) of the integral controller element (160) from the controller output and/or reversing the last accumulation of the integral controller element (160).

38. The method according to claim 37, further comprising the step of correcting one of the controlled variable and the control input supplied to the input of the PIV controller (4).

39. The method according to claim 38, wherein one of the controlled variable and the control input is corrected by way of stored correction values which take into consideration the mechanical inaccuracies of the control path (6).

40. The method according to claim 39, further comprising the step of increasing the accuracy of the controller output by a digital to analog converter connected to the output of the PIV controller (4) when averaged over time.

41. The method according to claim 40, further comprising the step of increasing the accuracy of the controller output by adding a sequence of values with a higher rate than the sampling rate to a sequence of sampled values of the controller output and by supplying the sequence to the connected digital to analog converter, wherein the sequence of values is selected in such a way that the output result of the digital to analog converter approximates the sequence of sampled values of the controller output when averaged over time.

42. The method according to claim 41, further comprising the step of temporarily decreasing the controller parameter ($K_V$) of the velocity controller element (144) for a time period when the controlled variable is substantially constant.

43. The method according to claim 42, further comprising the steps of converting the floating point numbers forming the basis for the internal computations of the PIV controller (4) into the integer numbers supplied to the digital to analog converter, such that the floating point intervals associated with each of the integer numbers are all of identical size.

44. The method according to claim 43, further comprising the step of supplying the position of a drive (33) included in at least one of the control path (6) and the position of a spindle (36) driven by the drive are supplied to the PIV controller (4) as the controlled variable.

45. An electroerosion apparatus including a controller for controlling a synchronized multi-axis system, comprising at least one controller parameter ($K_P$, $K_V$, $_I$) of a PIV controller (4) having at least one of a position controller element (140; 148), a velocity controller element (144) and an integral controller element (160) for controlling a drive (33) in an electroerosion apparatus utilizing a fuzzy controller (8), wherein a) a preset control input distribution of the position of the drive (33) is provided to the PIV controller (4) as an input variable for tuning; and b) at least one input variable of the fuzzy controller (8) is derived from a control variable of the PIV controller (4) based on an output of the control path (6); and c) at least one input variable of the fuzzy controller (8) is derived from a controller output of the PIV controller (4).

* * * * *